(12) United States Patent  
Kokojima et al.

(10) Patent No.: US 7,420,559 B2  
(45) Date of Patent: Sep. 2, 2008

(54) VIDEO RENDERING APPARATUS AND METHOD AND PROGRAM

(75) Inventors: Yoshiyuki Kokojima, Yokohama (JP); Kaoru Sugita, Iruma (JP); Masahiro Sekine, Yokohama (JP); Isao Mihara, Tokyo (JP); Sumihiko Yamamoto, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 139 days.

(21) Appl. No.: 11/387,791

(22) Filed: Mar. 24, 2006

(65) Prior Publication Data

US 2007/0046666 A1 Mar. 1, 2007

(30) Foreign Application Priority Data

Aug. 31, 2005 (JP) ............................. 2005-251512

(51) Int. Cl.
*G06T 15/20* (2006.01)
*G06K 9/00* (2006.01)
*G09G 5/00* (2006.01)
*G09G 5/02* (2006.01)

(52) U.S. Cl. .................. 345/427; 345/418; 345/586; 345/589; 345/536; 382/260; 382/284; 382/299; 382/305

(58) Field of Classification Search ................ 345/650, 345/418–419, 427–428, 581–586, 589, 591, 345/600, 601, 606, 619, 629, 630, 643, 652–654, 345/501, 530, 536, 547, 549, 552; 382/162, 382/254, 260, 274, 276–277, 284–285, 293, 382/299

See application file for complete search history.

(56) References Cited

U.S. PATENT DOCUMENTS

2007/0024824 A1* 2/2007 Damera-Venkata et al. ... 353/94
2007/0097334 A1* 5/2007 Damera-Venkata et al. ... 353/94
2007/0132965 A1* 6/2007 Damera-Venkata et al. ... 353/94

OTHER PUBLICATIONS

Smith, "A Digital Library for Geographically Referenced Materials", 1996, IEEE, pp. 54-60.*
Kavita Bala, et al., Combining Edges and Points for Interactive High-Quality Rendering, Appears in the ACM Siggraph Conference Proceedings, 2003, pp. 1-10.
Sung Cheol Park, et al., Super-Resolution Image Reconstruction: A Technical Overview, IEEE Signal Processing Magazine, May 2003, pp. 21-36.

* cited by examiner

*Primary Examiner*—Wesner Sajous
(74) *Attorney, Agent, or Firm*—Oblon, Spivak, McClelland, Maier & Neustadt, P.C.

(57) ABSTRACT

Apparatus includes unit storing CG data containing data about coordinate transformation, camera, geometry, light source, and texture, unit transforming coordinate system of CG data into camera-coordinate system, unit calculating intersections of object and ray vectors passing through sampled points, unit calculating 3D motion vectors, unit calculating color values at intersections, unit assigning object IDs of intersections at 3D coordinates to intersections, unit projecting intersections and 3D motion vectors onto plane, and calculating 2D coordinates at intersections and 2D motion vectors at intersections, unit storing 2D coordinates, 2D motion vectors, color values, and object IDs together as low-resolution video data, unit calculating intermediate-resolution video data by superimposing low-resolution video data of current frame onto low-resolution video data of frames temporally different from current frame, unit calculating high-resolution video data by filtering intermediate-resolution video data, unit storing high-resolution video data, and unit presenting high-resolution video data.

22 Claims, 26 Drawing Sheets

Coordinate transformation data

World matrix
View matrix
Projection matrix
Viewport scaling matrix

Camera data

View volume

Geometry data

3D coordinates of vertices
Index values of vertices
3D motion vectors at vertices
Color value of vertices
Texture coordinates of vertices
Normal vectors at vertices
Object IDs of vertices

Light source data

Type of light source
3D coordinates of light source
Color value of light source

Texture data

Texture image

FIG. 2

Geometry data

3D coordinates of vertices
3D motion vectors at vertices
Normal vectors at vertices

Light source data

3D coordinates of light source

FIG. 3

Frame 1
2D coordinates of intersection 1
2D motion vector at intersection 1
Object ID of intersection 1
Color of intersection 1
2D coordinates of intersection 2
2D motion vector at intersection 2
Object ID of intersection 2
Color of intersection 2

⋮

2D coordinates of intersection $n_1$
2D motion vector at intersection $n_1$
Object ID of intersection $n_1$
Color of intersection $n_1$ ⎫ Low-resolution video data of frame 1

Frame 2
2D coordinates of intersection 1
2D motion vector at intersection 1
Object ID of intersection 1
Color of intersection 1
2D coordinates of intersection 2
2D motion vector at intersection 2
Object ID of intersection 2
Color of intersection 2

⋮

2D coordinates of intersection $n_2$
2D motion vector at intersection $n_2$
Object ID of intersection $n_2$
Color of intersection $n_2$ ⎫ Low-resolution video data of frame 2

· · · · · ·

Frame m
2D coordinates of intersection 1
2D motion vector at intersection 1
Object ID of intersection 1
Color of intersection 1
2D coordinates of intersection 2
2D motion vector at intersection 2
Object ID of intersection 2
Color of intersection 2

⋮

2D coordinates of intersection $n_m$
2D motion vector at intersection $n_m$
Object ID of intersection $n_m$
Color of intersection $n_m$ ⎫ Low-resolution video data of frame m

F I G. 13

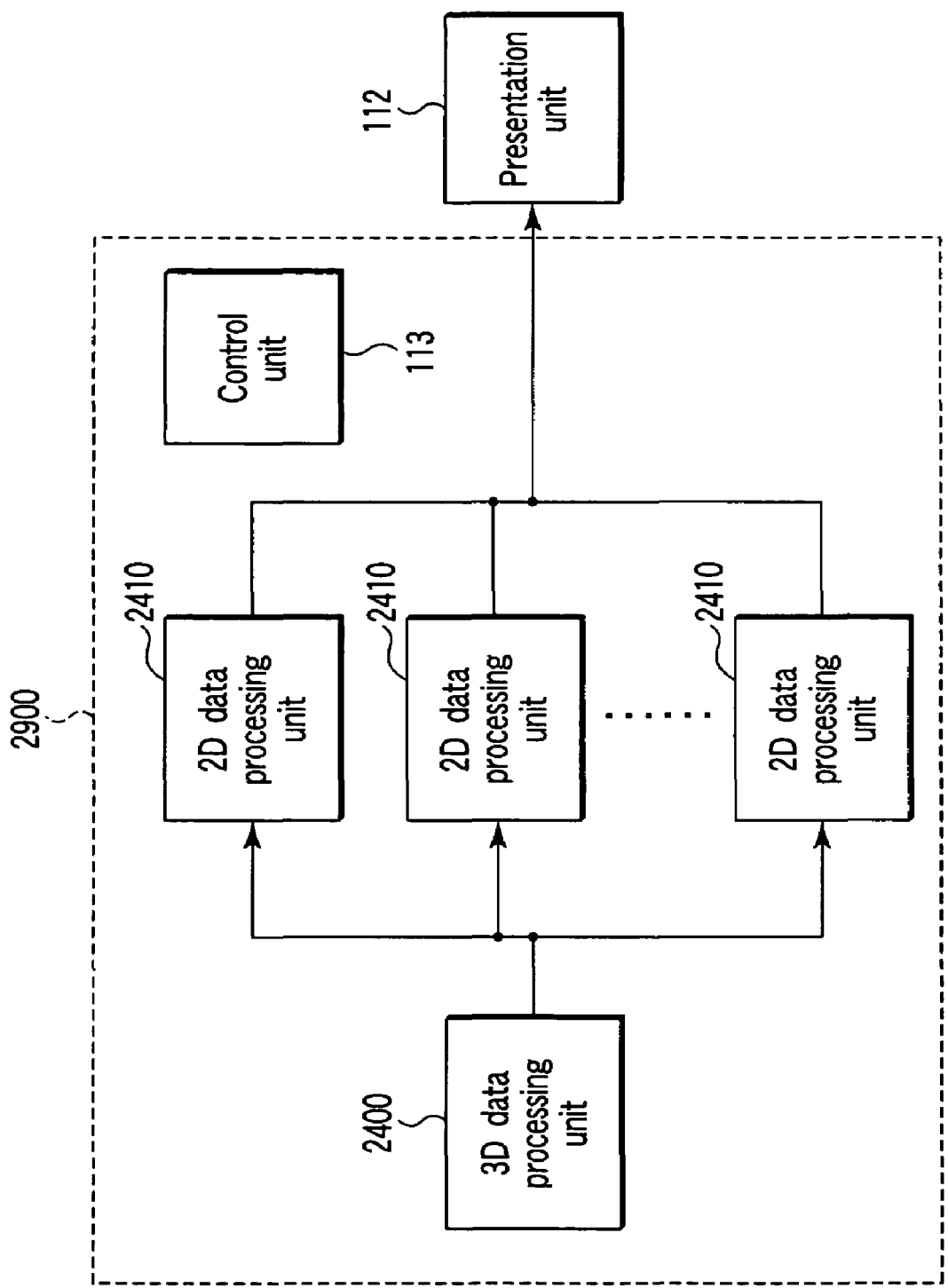
F I G. 29

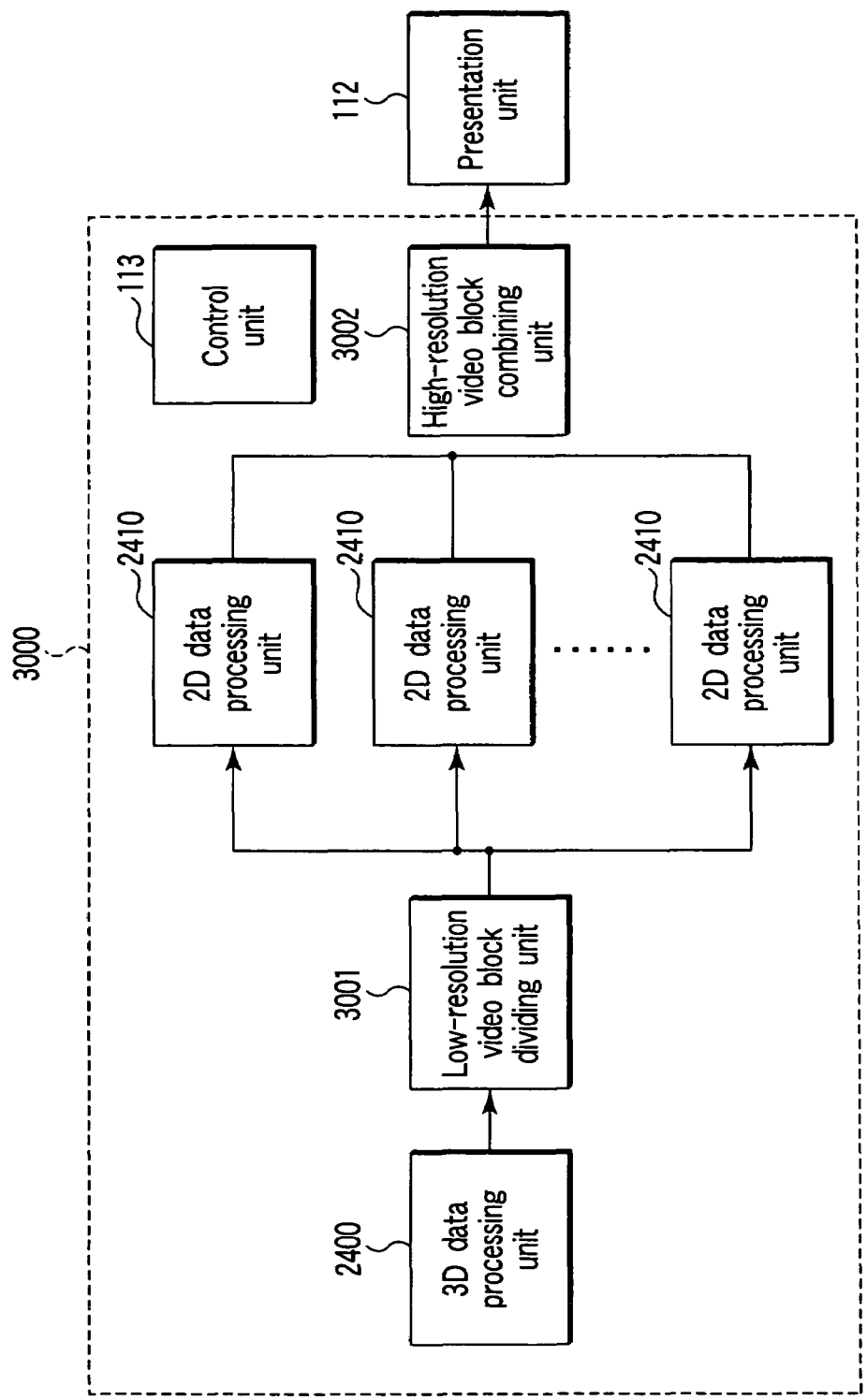
F I G. 30

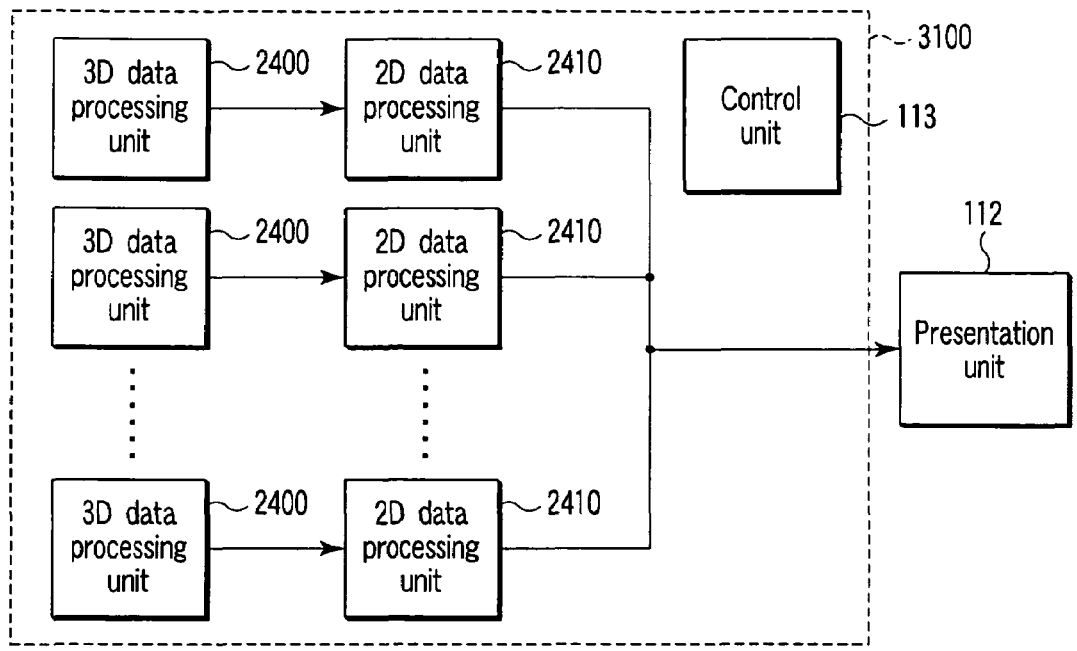
F I G. 31
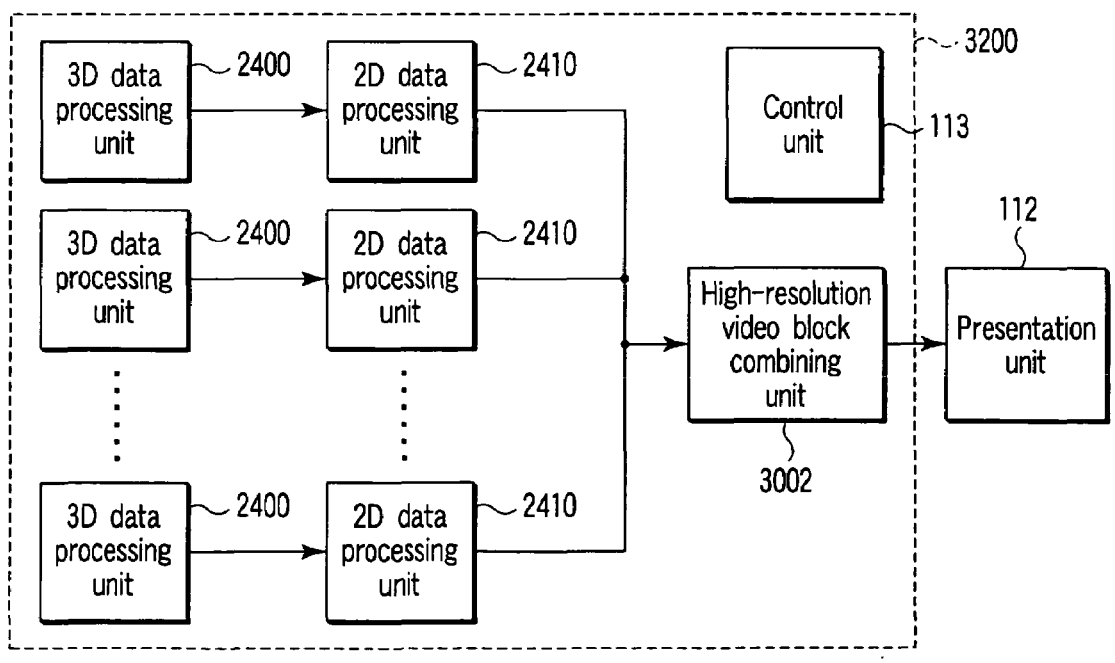
F I G. 32

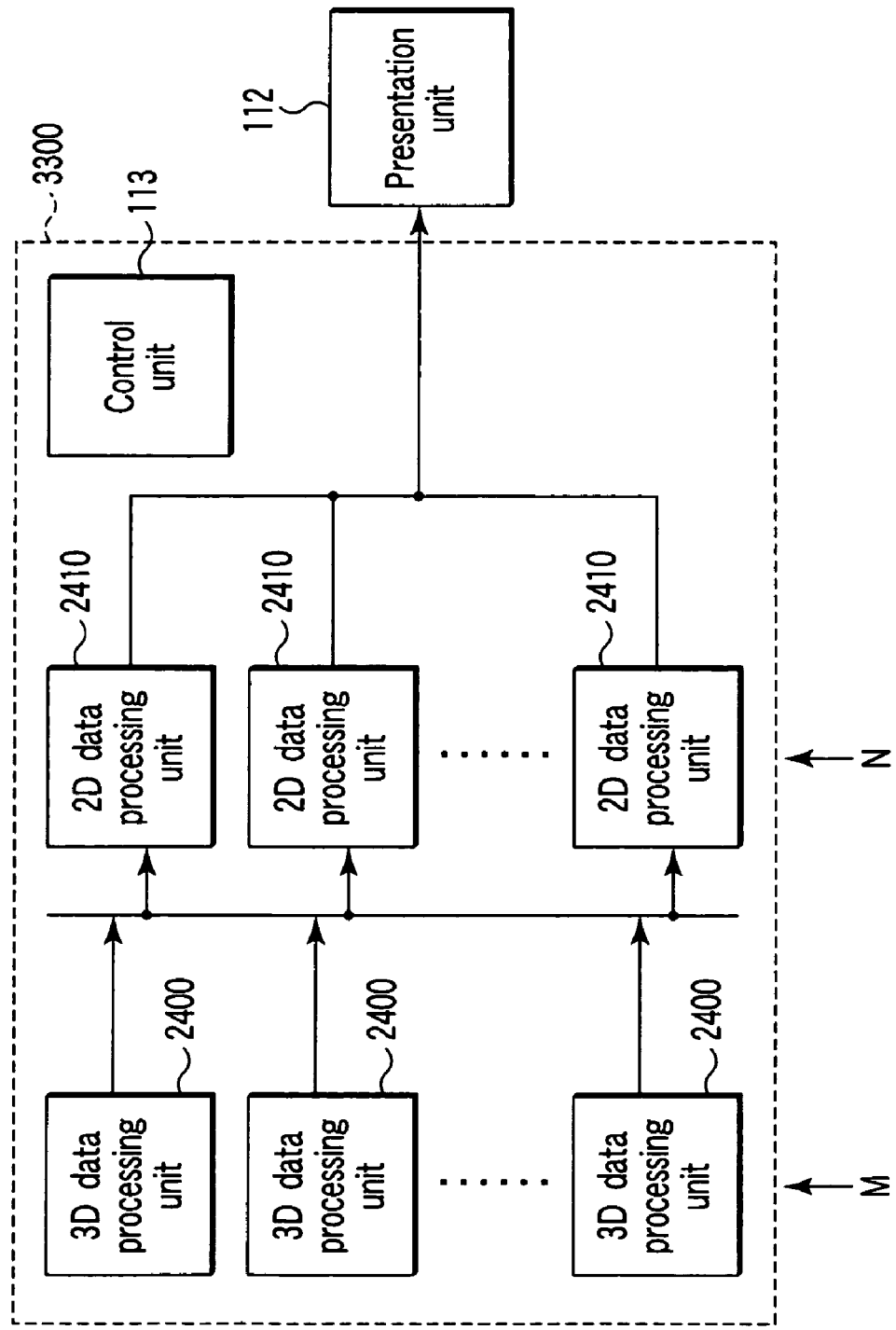
F I G. 33

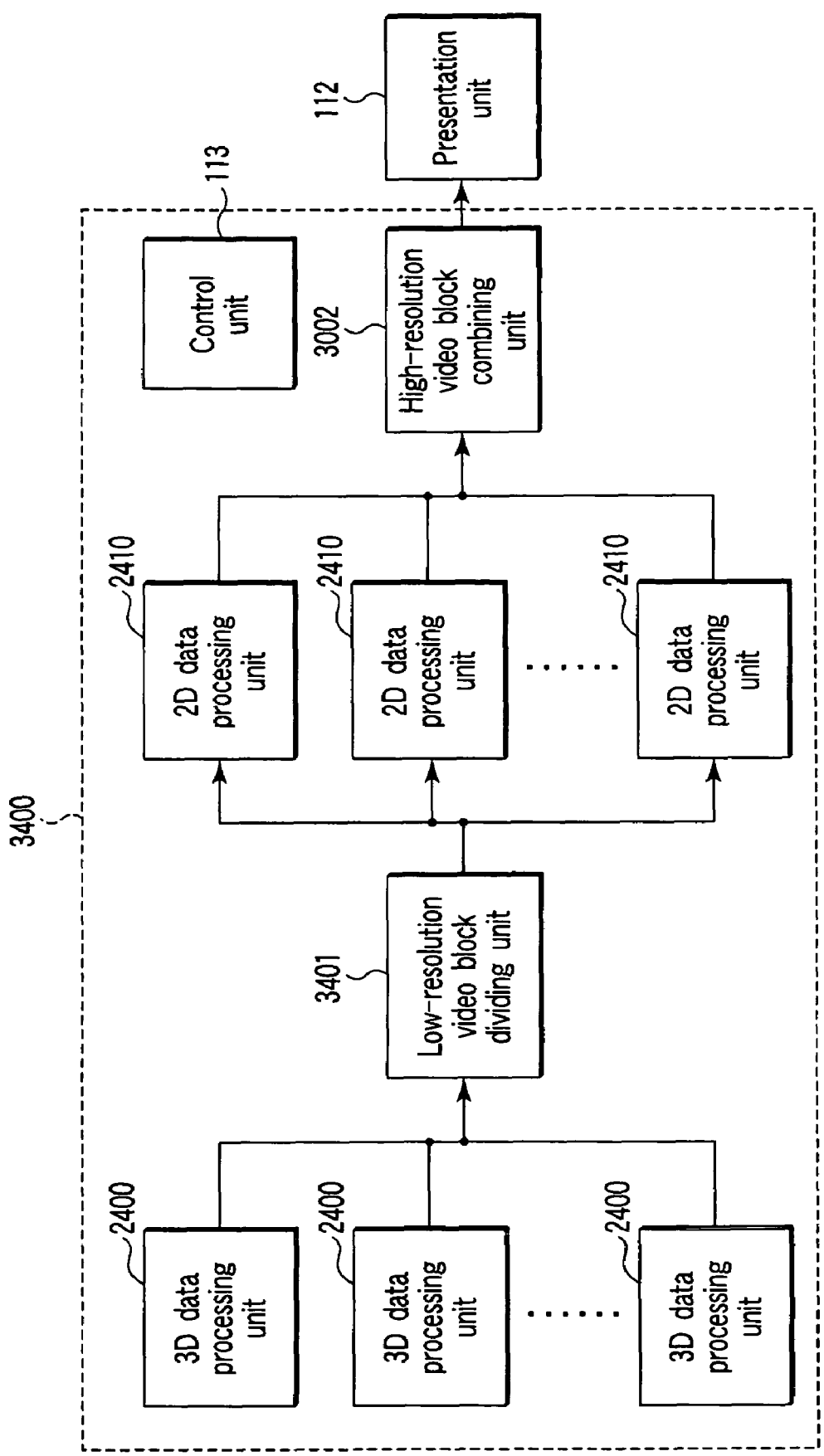
F I G. 34

VIDEO RENDERING APPARATUS AND METHOD AND PROGRAM

CROSS-REFERENCE TO RELATED APPLICATIONS

This application is based upon and claims the benefit of priority from prior Japanese Patent Application No. 2005-251512, filed Aug. 31, 2005, the entire contents of which are incorporated herein by reference.

BACKGROUND OF THE INVENTION

1. Field of the Invention

The present invention relates to a video rendering apparatus and method and a program for the rendering of videos.

2. Description of the Related Art

In computer graphics (CG) rendering, a technique called global illumination is used. Global illumination is a technique for performing illumination calculation in rendering an object in a scene in consideration of the influences of indirect light from other objects around the target object.

Conventional illumination calculation cannot reproduce an effect produced when light reflected by an object illuminates another object, and hence is performed considering that uniform light called ambient light illuminates portions to which light is not directly applied. In contrast to this, global illumination can express a reflection effect and light-gathering effect similar to those in the real world, and hence allows more realistic rendering of videos.

Indirect light calculation techniques in global illumination include several types, e.g., radiosity, photonmap, and path tracing. All these techniques are based on intersection determination of lines of sight (rays) passing through pixels of an image and an object. Basically, therefore, the calculation time is proportional to the resolution of an image.

For this reason, attempts have been made to shorten the calculation time and interactively render a global illumination video by performing intersection determination only at low-resolution sampling points placed at proper intervals, instead of performing intersection determination of rays and an object with respect to all the pixels of an image, and increasing the resolution of the resultant data by filtering afterward.

In these attempts, some contrivance is made to, for example, concentrate sampling points at positions which greatly differ from each other in terms of time, instead of placing sampling points at equal intervals, or change the tap positions for filtering (which indicate specific points to be filtered) so as to prevent the contour lines of an object from blurring (see, for example, K. Bala, B. Walter, and D. P. Greenberg, "Combining Edges and Points for Interactive High-Quality Rendering", SIGGRAPH2003).

On the other hand, in the field of study on computer vision, studies have been made to reconstruct high-resolution moving images from low-resolution moving images. These studies are roughly classified into two categories including one that uses only the image of one frame and the other that uses the images of a plurality of frames. The former is not very high in reconstruction accuracy because of a limitation on the amount of information obtained, but allows relatively stable calculation. In contrast, the latter is high in theoretical reconstruction accuracy because of the use of the information of a plurality of frames, but needs to calculate matching between a plurality of frames at the subpixel level, which is difficult to stably perform (see, for example, Sung Cheol Park, Min Kyu Park, and Moon Gi Kang, "Super-Resolution Image Reconstruction: A Technical Overview", IEEE SIGNAL PROCESSING MAGAZINE, May 2003).

As described above, the conventional video rendering apparatus is designed to shorten the calculation time by performing intersection determination of rays and an object only at low-resolution sampling points in rendering a global illumination video, and increasing the resolution of the resultant data by filtering them.

However, since only sampling points in one frame are used for calculation for an increase in resolution, the number of sampling points per frame must be relatively large in order to improve the quality of a high-resolution video. That is, it is difficult to satisfy both the requirements of a shorter calculation time and higher quality.

On the other hand, in the field of computer vision, a resolution increasing technique using a plurality of frames has been studied. This technique may be applied to the calculation of global illumination. However, it is impossible to stably calculate subpixel matching between a plurality of frames, which is required for the above application.

If the pattern (texture) of an object is homogeneous, or the luminance of the object changes with time, a matching error often occurs. In Sung Cheol Park et. al. described above, there is described a technique for reducing the influence of a matching error by performing iterative calculation based on a statistical error model. However, this technique requires a large amount of calculation, and hence is not very suitable for interactive applications.

BRIEF SUMMARY OF THE INVENTION

In accordance with a first aspect of the invention, there is provided a video rendering apparatus comprising: a first storage unit configured to store computer graphics (CG) data containing data about coordinate transformation, data about a camera, data about geometry, data about a light source, and data about texture; a transformation unit configured to transform a coordinate system of the CG data into a camera coordinate system which is a coordinate system viewed from a viewpoint; a first calculation unit configured to calculate a plurality of intersections of an object in 3-dimensional (3D) space and ray vectors passing through sampled points sampled from pixels on an image plane by referring the transformed CG data; a second calculation unit configured to calculate a plurality of 3D motion vectors at the intersections by referring the transformed CG data; a third calculation unit configured to calculate a plurality of color values at the intersections by referring the transformed CG data; an assignment unit configured to assign a plurality of object identifications of the intersections which differ for each object to the intersections by referring the transformed CG data; a projection unit configured to project the intersections and the 3D motion vectors onto a projection plane by referring the transformed CG data, and to calculate 2-dimentional (2D) coordinates at the intersections and 2D motion vectors at the intersections; a resolution storage unit configured to store the 2D coordinates, the 2D motion vectors, the color values, and the assigned object IDs together as low-resolution video data in frame; an intermediate-resolution calculation unit configured to calculate intermediate-resolution video data by superimposing low-resolution video data of a current frame onto low-resolution video data of a plurality of frames temporally different from the current frame; a high-resolution calculation unit configured to calculate high-resolution video data by filtering the intermediate-resolution video data; a second storage unit configured to store the high-resolution video data in frame; and a presentation unit configured to present the high-resolution video data.

In accordance with a second aspect of the invention, there is provided a video rendering apparatus comprising a 3-dimensional (3D) data processing unit and a 2-dimentional (2D) data processing unit:

the 3D data processing unit including: a first storage unit configured to store computer graphics (CG) data containing data about coordinate transformation, data about a camera, data about geometry, data about a light source, and data about texture; a transformation unit configured to transform a coordinate system of the CG data into a camera coordinate system which is a coordinate system viewed from a viewpoint; a first calculation unit configured to calculate a plurality of intersections of an object in 3D space and ray vectors passing through sampled points sampled from pixels on an image plane by referring the transformed CG data; a second calculation unit configured to calculate a plurality of 3D motion vectors at the 3D coordinates by referring the transformed CG data; a third calculation unit configured to calculate a plurality of color values at the intersections by referring the transformed CG data; an assignment unit configured to assign a plurality of object identifications of the intersections which differ for each object, at the 3D coordinates, to the intersections by referring the transformed CG data; a projection unit configured to project the intersections and the 3D motion vectors onto a projection plane by referring the transformed CG data, and to calculate 2D coordinates at the intersections and 2D motion vectors at the intersections; and a resolution storage unit configured to store the 2D coordinates, the 2D motion vectors, the color values, and the assigned object IDs together as low-resolution video data in frame, and the 2D data processing unit including: a resolution storage unit configured to store the 2D coordinates, the 2D motion vectors, the color values, and the assigned object IDs together as low-resolution video data in frame; an intermediate-resolution calculation unit configured to calculate intermediate-resolution video data by superimposing low-resolution video data of a current frame onto low-resolution video data of a plurality of frames temporally different from the current frame; a high-resolution calculation unit configured to calculate high-resolution video data by filtering the intermediate-resolution video data; a second storage unit configured to store the high-resolution video data in frame; and a presentation unit configured to present the high-resolution video data.

In accordance with a third aspect of the invention, there is provided a video rendering apparatus comprising: a resolution storage unit configured to store a plurality of 2-dimensional (2D) coordinates of intersections of an object in 3-dimensional (3D) space and ray vectors passing through sampling points sampled from pixels of an image plane and a plurality of 2D motion vectors at the intersections, which are obtained by projecting 3D coordinates of the intersections and 3D motion vectors at the intersections of the 3D coordinates onto a projection plane by using CG data transformed into a camera coordinate system as a coordinate system viewed from a viewpoint, a plurality of color values of the intersections at the intersections of the 3D coordinates, and a plurality of object IDs of the intersections which differ for each object, together as low-resolution video data in frame; an intermediate-resolution calculation unit configured to calculate intermediate-resolution video data by superimposing low-resolution video data of a current frame onto low-resolution video data of a plurality of frames temporally different from the current frame; a high-resolution calculation unit configured to calculate high-resolution video data by filtering the intermediate-resolution video data; a storage unit configured to store the high-resolution video data in frame; and a presentation unit configured to present the high-resolution video data.

In accordance with a fourth aspect of the invention, there is provided a video rendering method comprising: preparing a first storage unit configured to store computer graphics (CG) data containing data about coordinate transformation, data about a camera, data about geometry, data about a light source, and data about texture; transforming a coordinate system of the CG data into a camera coordinate system which is a coordinate system viewed from a viewpoint; calculating a plurality of intersections of an object in 3-dimensional (3D) space and ray vectors passing through sampled points sampled from pixels on an image plane by referring the transformed CG data; calculating a plurality of 3D motion vectors at the intersections by referring the transformed CG data; calculating a plurality of color values at the intersections by referring the transformed CG data; assigning a plurality of object identifications of the intersections which differ for each object to the intersections by referring the transformed CG data; projecting the intersections and the 3D motion vectors onto a projection plane by referring the transformed CG data, and calculating 2-dimentional (2D) coordinates at the intersections and 2D motion vectors at the intersections; preparing a resolution storage unit configured to store the 2D coordinates, the 2D motion vectors, the color values, and the assigned object IDs together as low-resolution video data in frame; calculating intermediate-resolution video data by superimposing low-resolution video data of a current frame onto low-resolution video data of a plurality of frames temporally different from the current frame; calculating high-resolution video data by filtering the intermediate-resolution video data; preparing a second storage unit configured to store the high-resolution video data in frame; and presenting the high-resolution video data.

In accordance with a fifth aspect of the invention, there is provided a video rendering program stored in a computer readable medium comprising: means for instructing a computer to store computer graphics (CG) data containing data about coordinate transformation, data about a camera, data about geometry, data about a light source, and data about texture; means for instructing the computer to transform a coordinate system of the CG data into a camera coordinate system which is a coordinate system viewed from a viewpoint; means for instructing the computer to calculate a plurality of intersections of an object in 3-dimensional (3D) space and ray vectors passing through sampled points sampled from pixels on an image plane by referring the transformed CG data; means for instructing the computer to calculate a plurality of 3D motion vectors at the intersections by referring the transformed CG data; means for instructing the computer to calculate a plurality of color values at the intersections by referring the transformed CG data; means for instructing the computer to assign a plurality of object identifications (IDs) of the intersections which differ for each object to the intersections by referring the transformed CG data; means for instructing the computer to project the intersections and the 3D motion vectors onto a projection plane by referring the transformed CG data, and calculate 2-dimentional (2D) coordinates at the intersections and 2D motion vectors at the intersections; means for instructing the computer to store the 2D coordinates, the 2D motion vectors, the color values of the intersections, and the assigned object IDs together as low-resolution video data in frame; means for instructing the computer to calculate intermediate-resolution video data by superimposing low-resolution video data of a current frame onto low-resolution video data of a plurality of frames temporally different from the current frame; means for instructing the computer to a high-resolution video calculation unit configured to calculate high-resolution video data by filtering the intermediate-resolution video data; means for instructing the computer to store the high-resolution video data in frame; and means for instructing the computer to present the high-resolution video data.

BRIEF DESCRIPTION OF THE SEVERAL VIEWS OF THE DRAWING

FIG. 2 is view showing an example of CG data stored in a CG data storage unit in FIG. 1;

FIG. 3 is a view showing an example of CG data which is coordinate-transformed by a coordinate transformation unit in FIG. 1;

FIG. 13 is a view showing an example of low-resolution video data stored in a first-resolution video sequence storage unit in FIG. 1;

Figure 1:
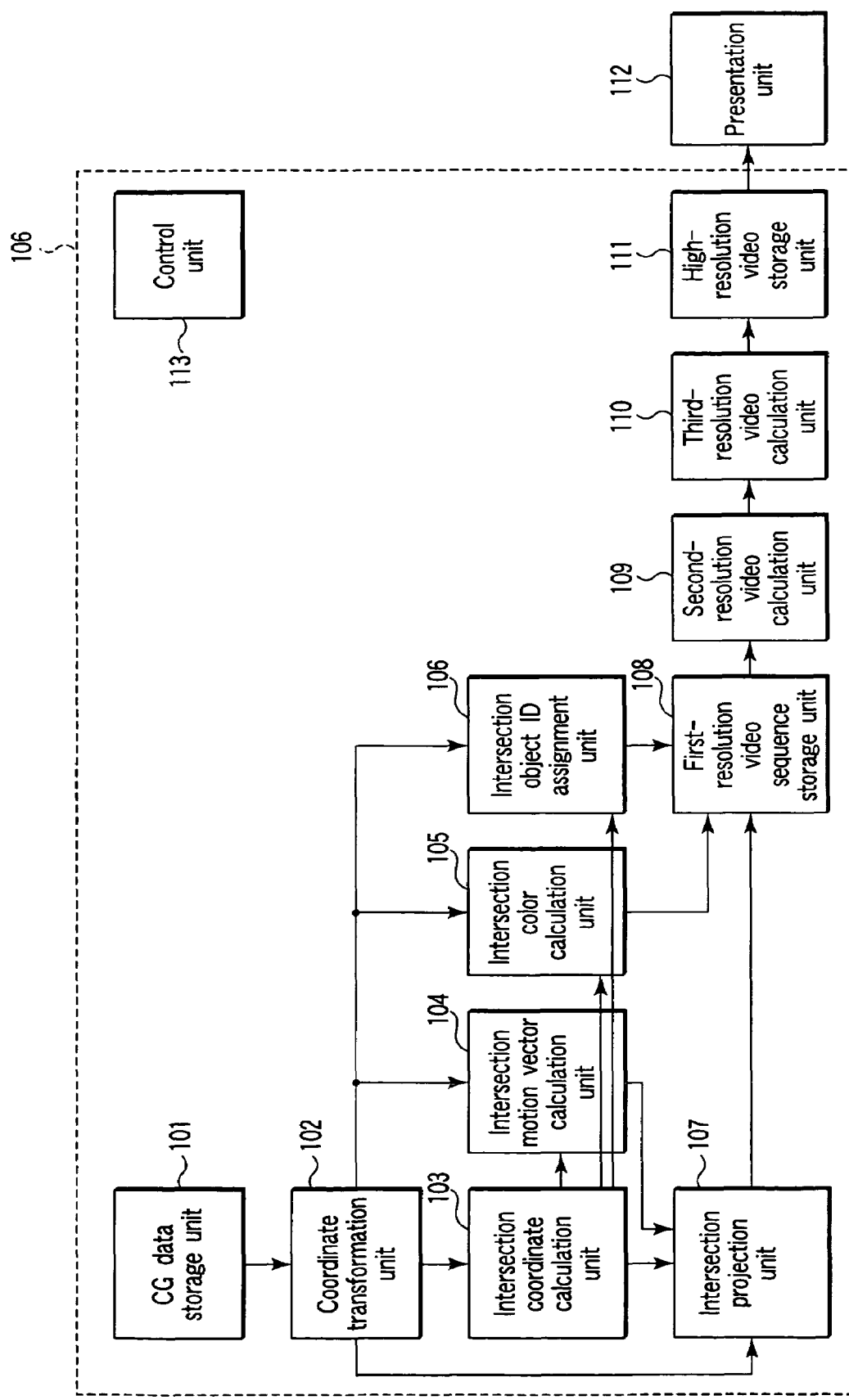
FIG. 1 is a block diagram of a video rendering apparatus according to the first embodiment of the present invention.
Figure 19:
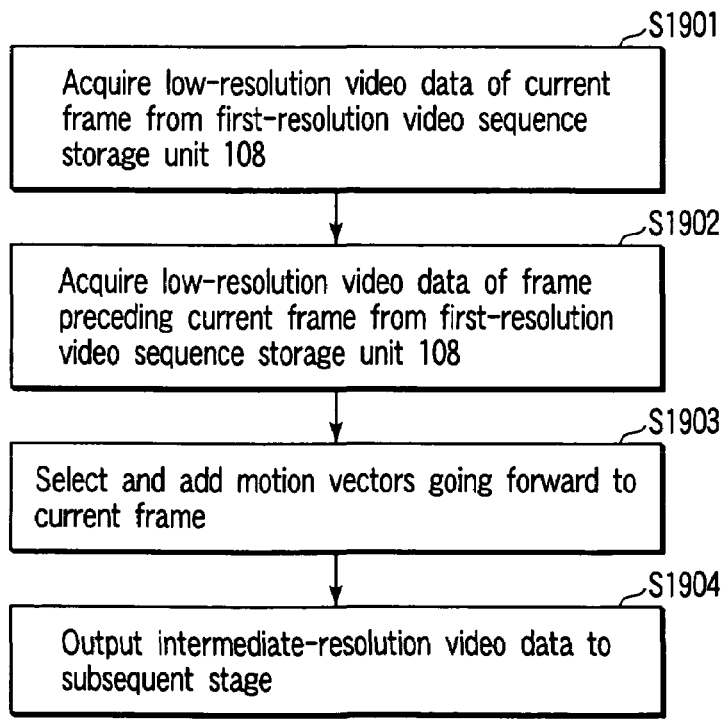
Figure 15:
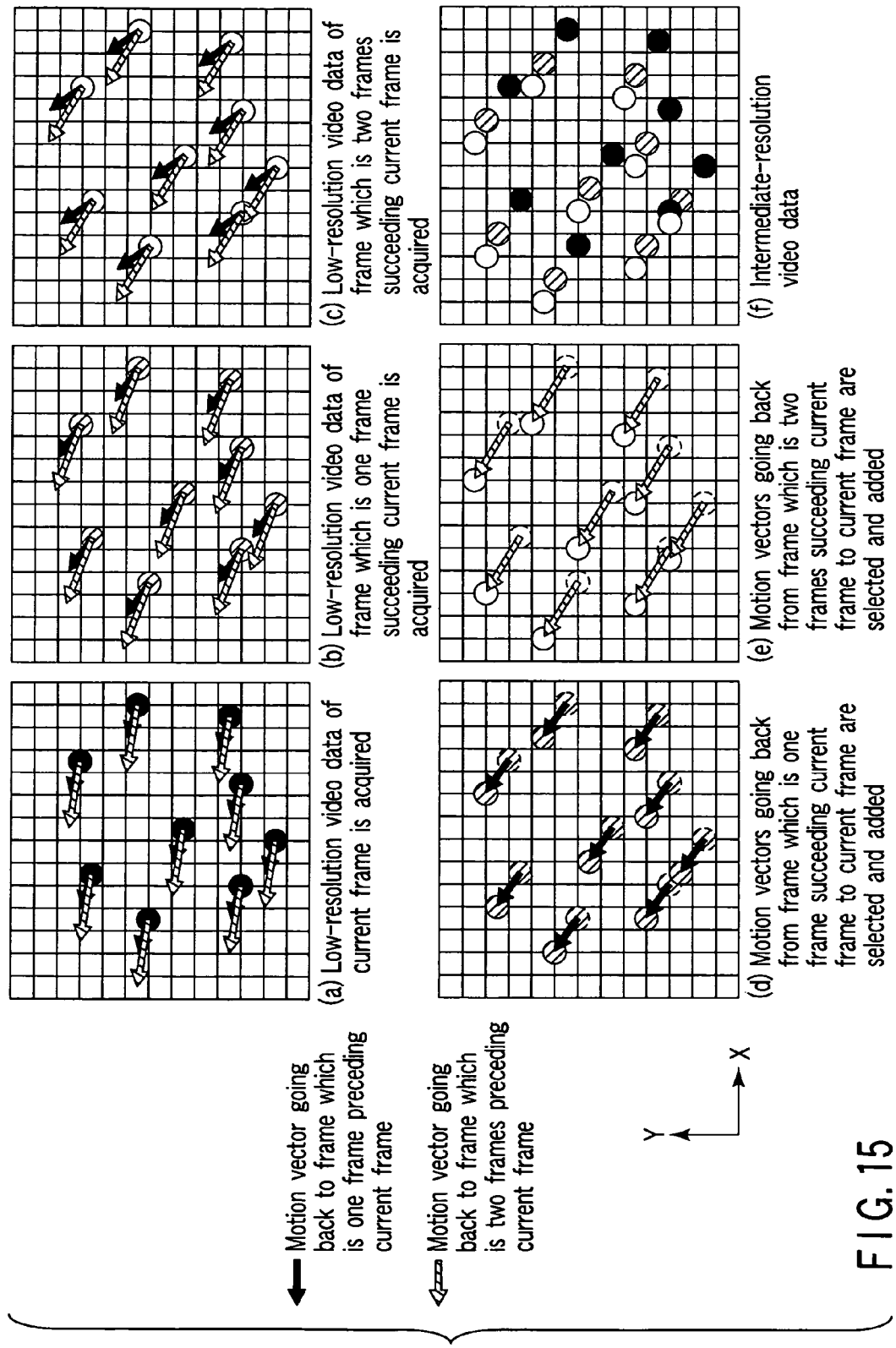
Figure 16:
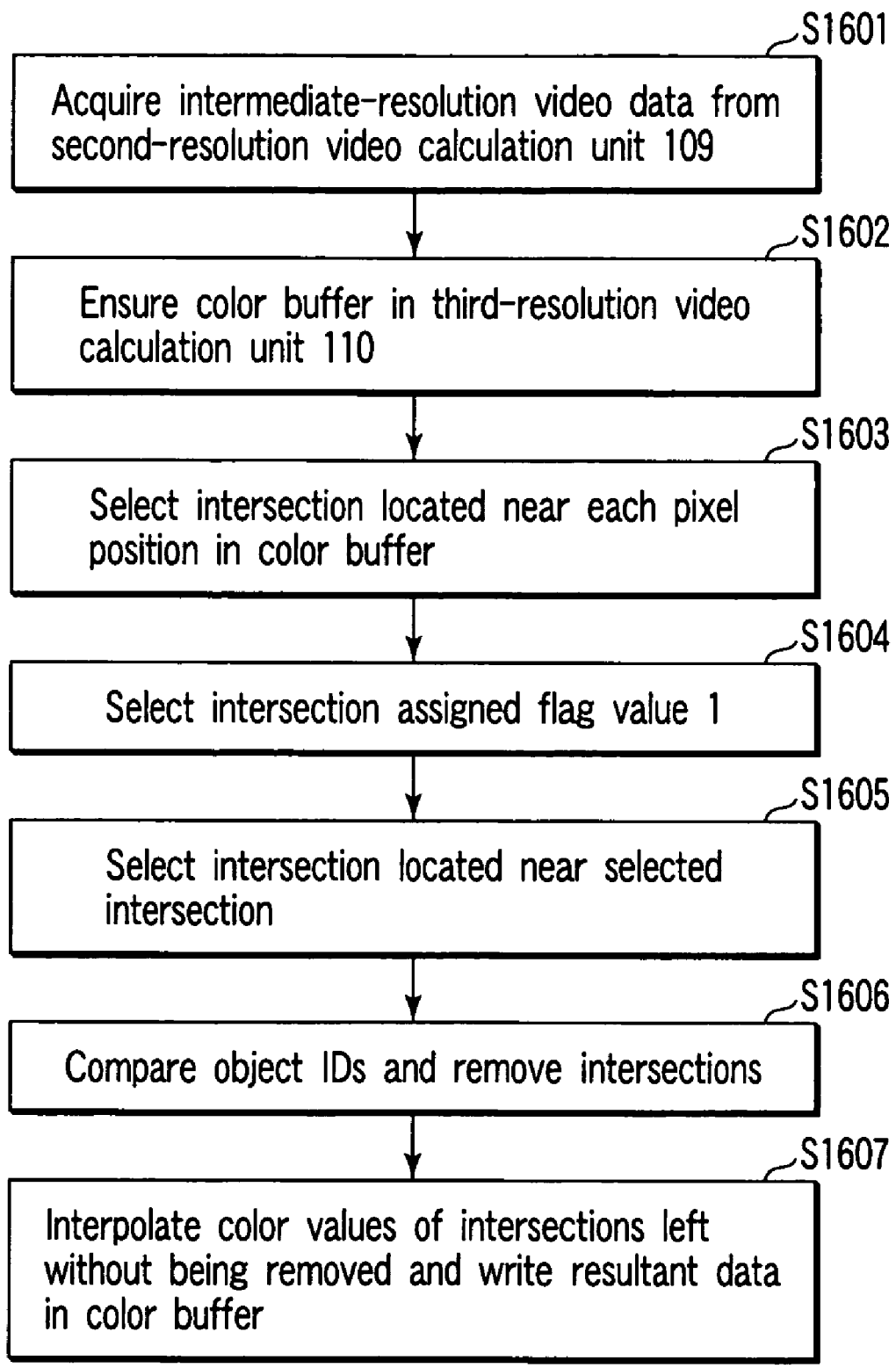
Figure 17:
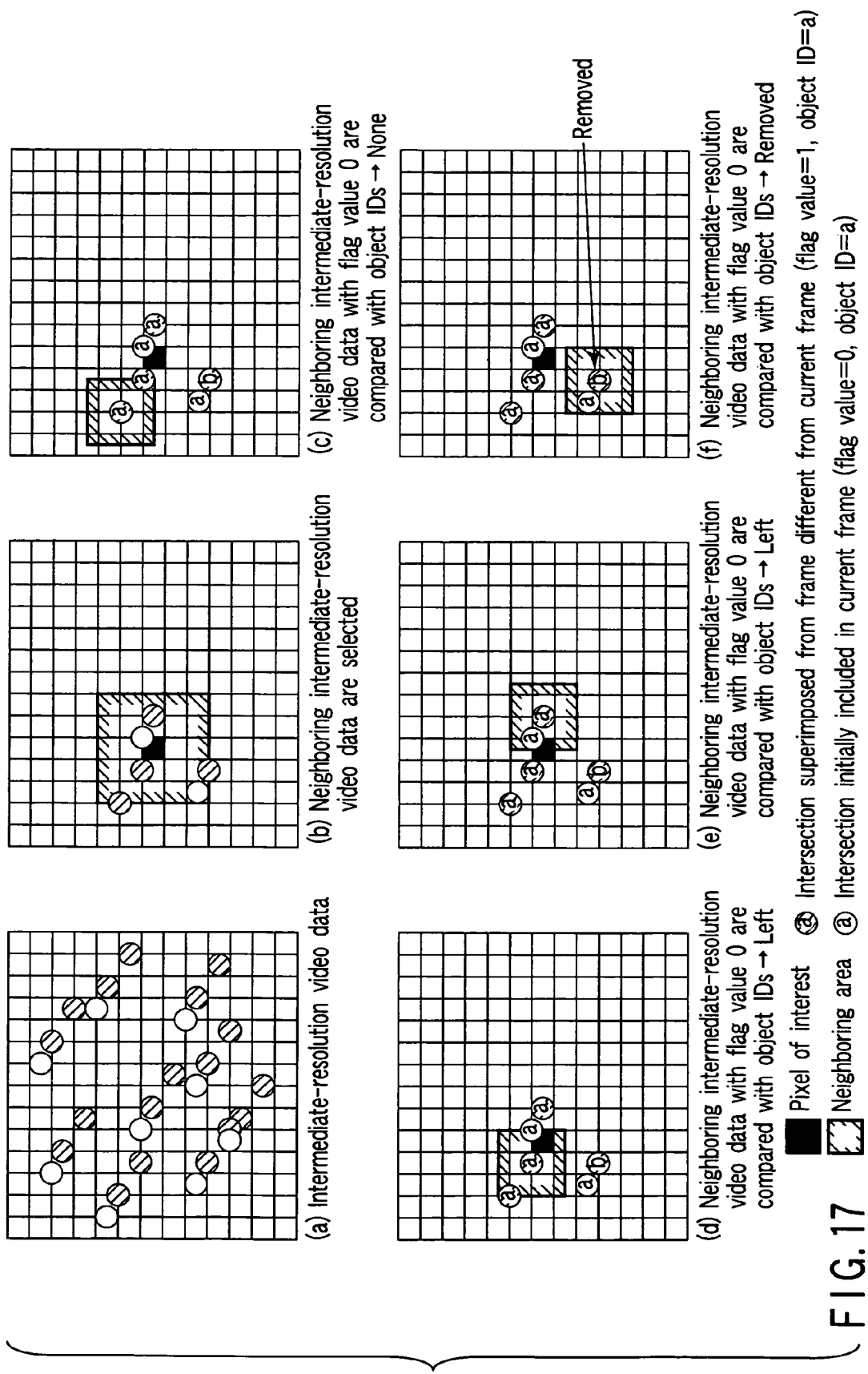
Figure 18:
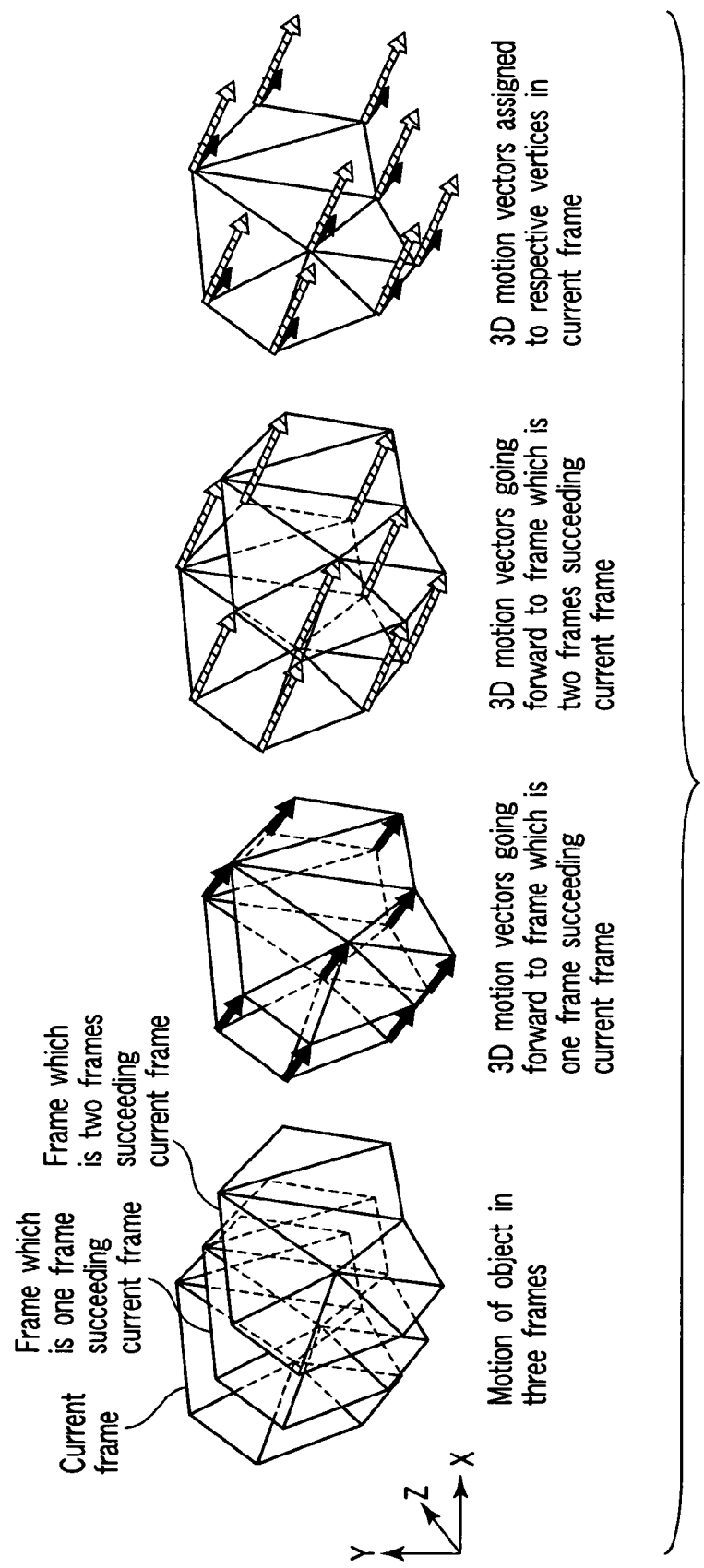
Figure 20:
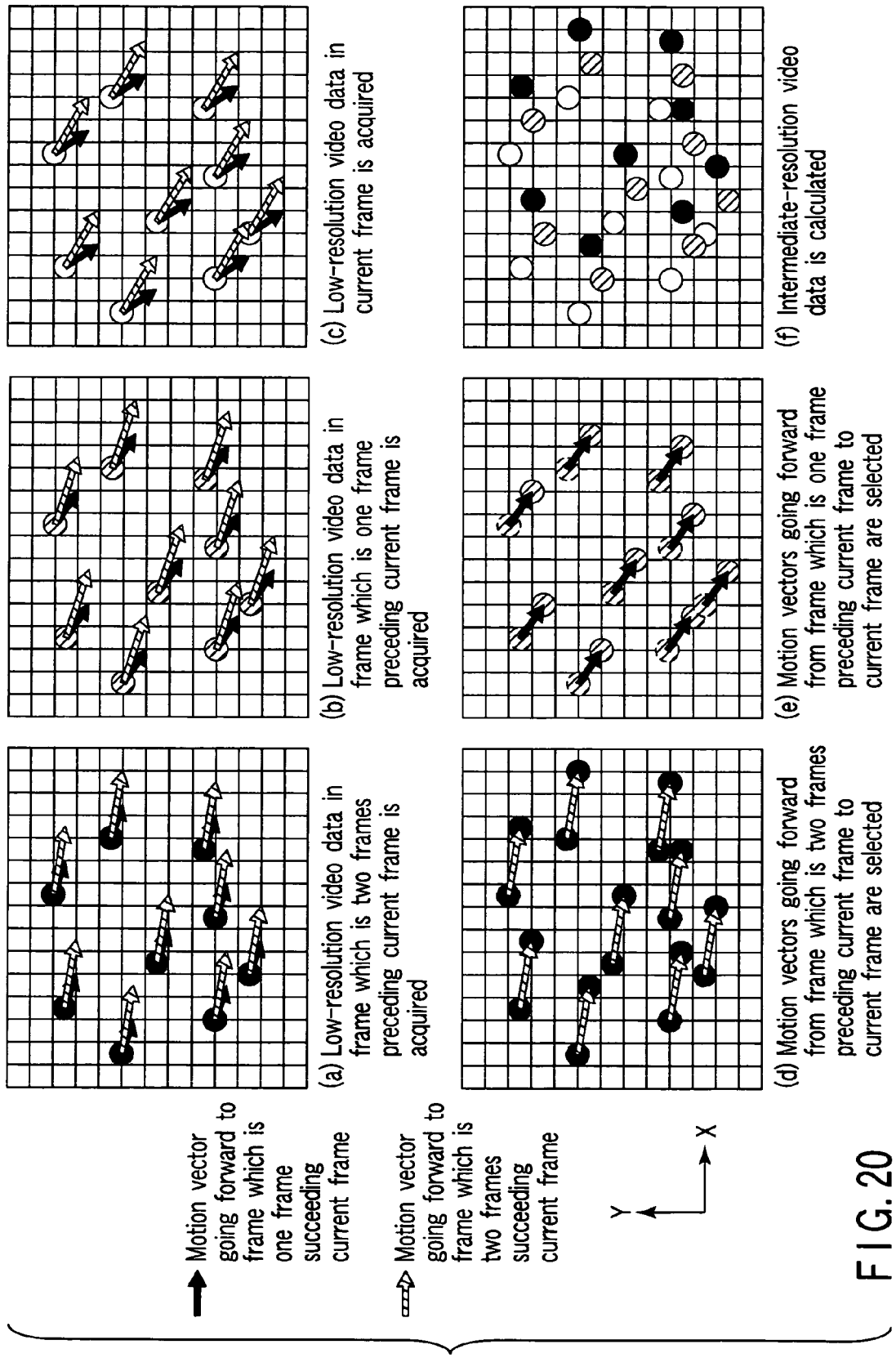
Figure 21:
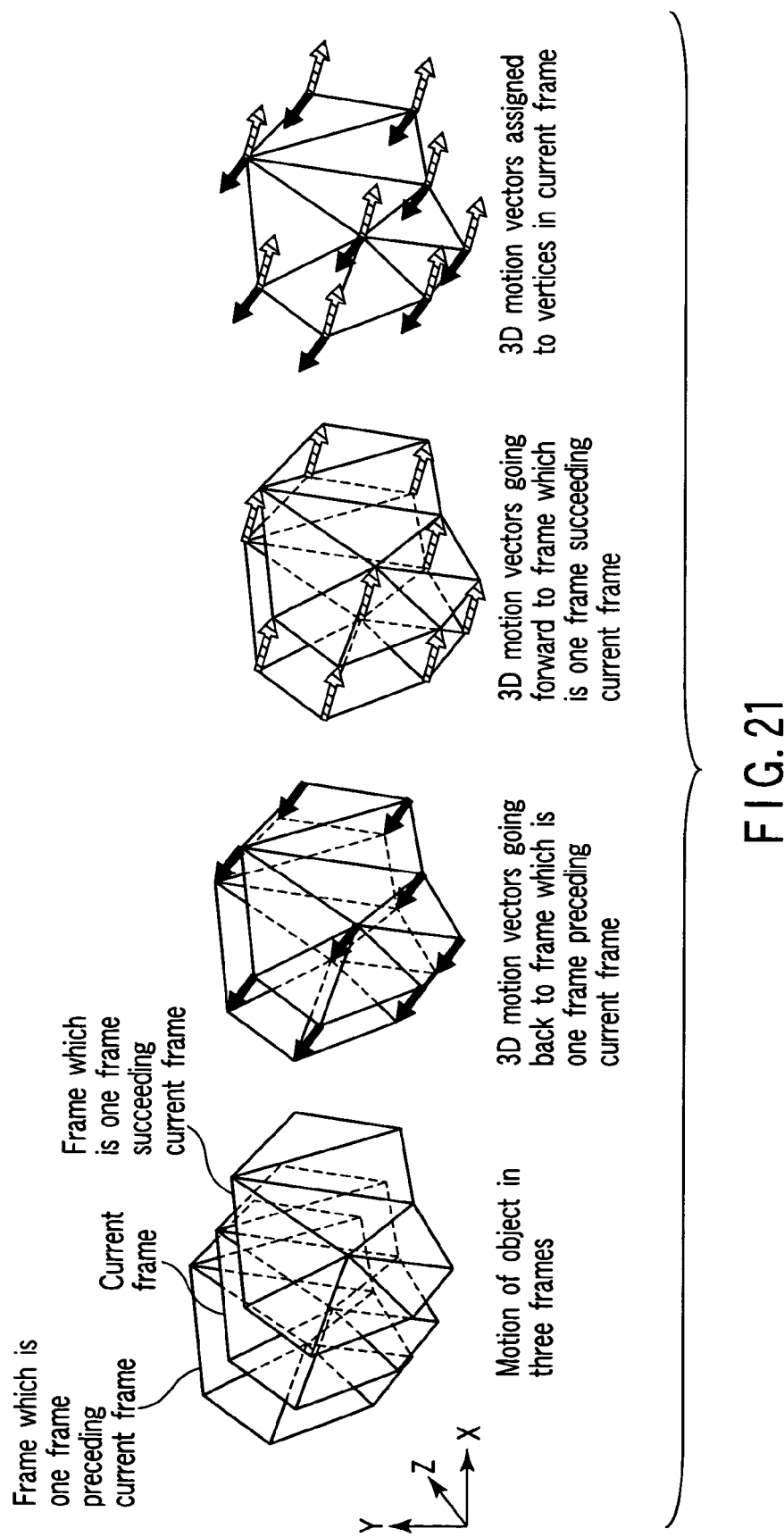
Figure 22:
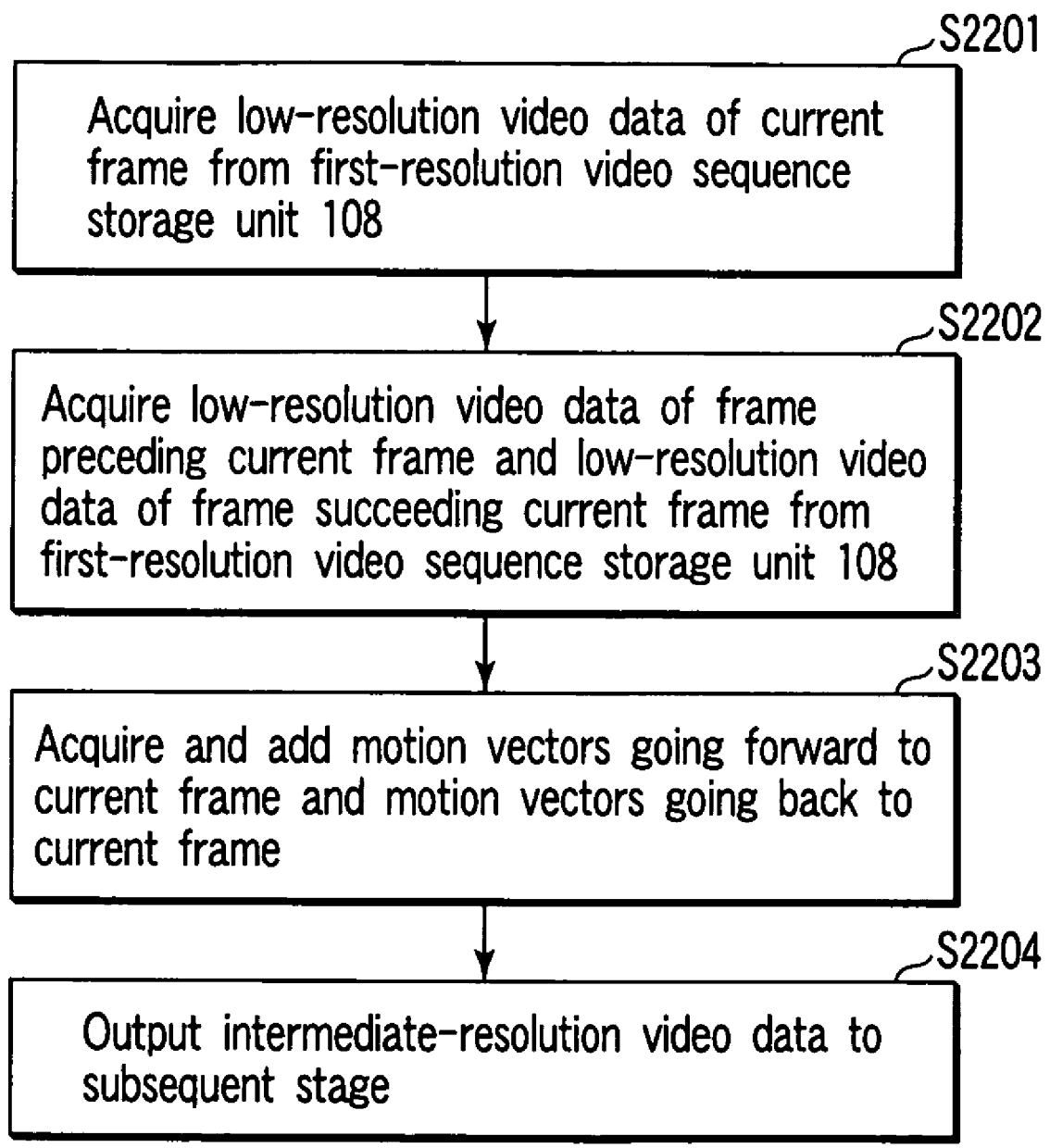
Figure 23:
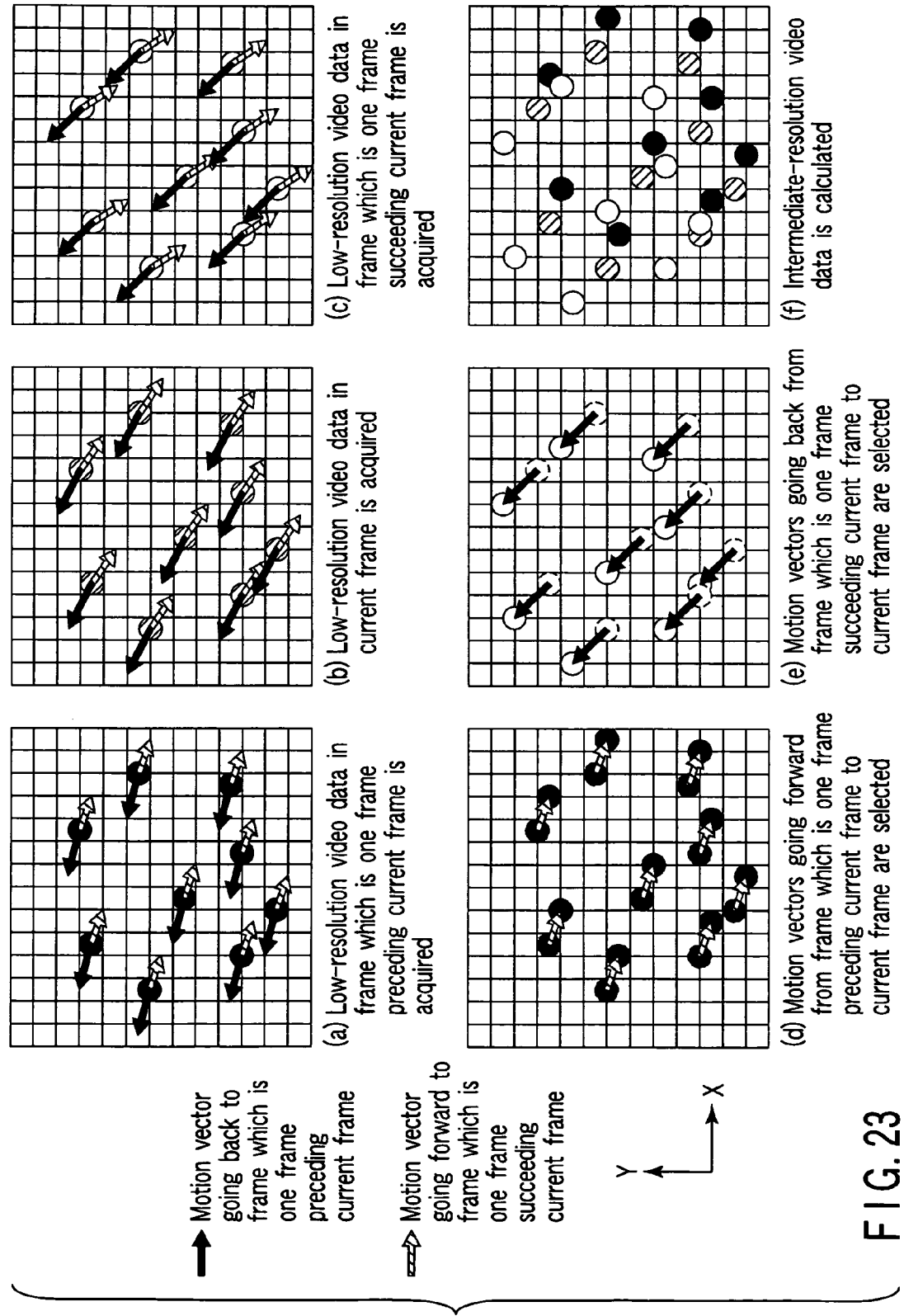
Figure 24:
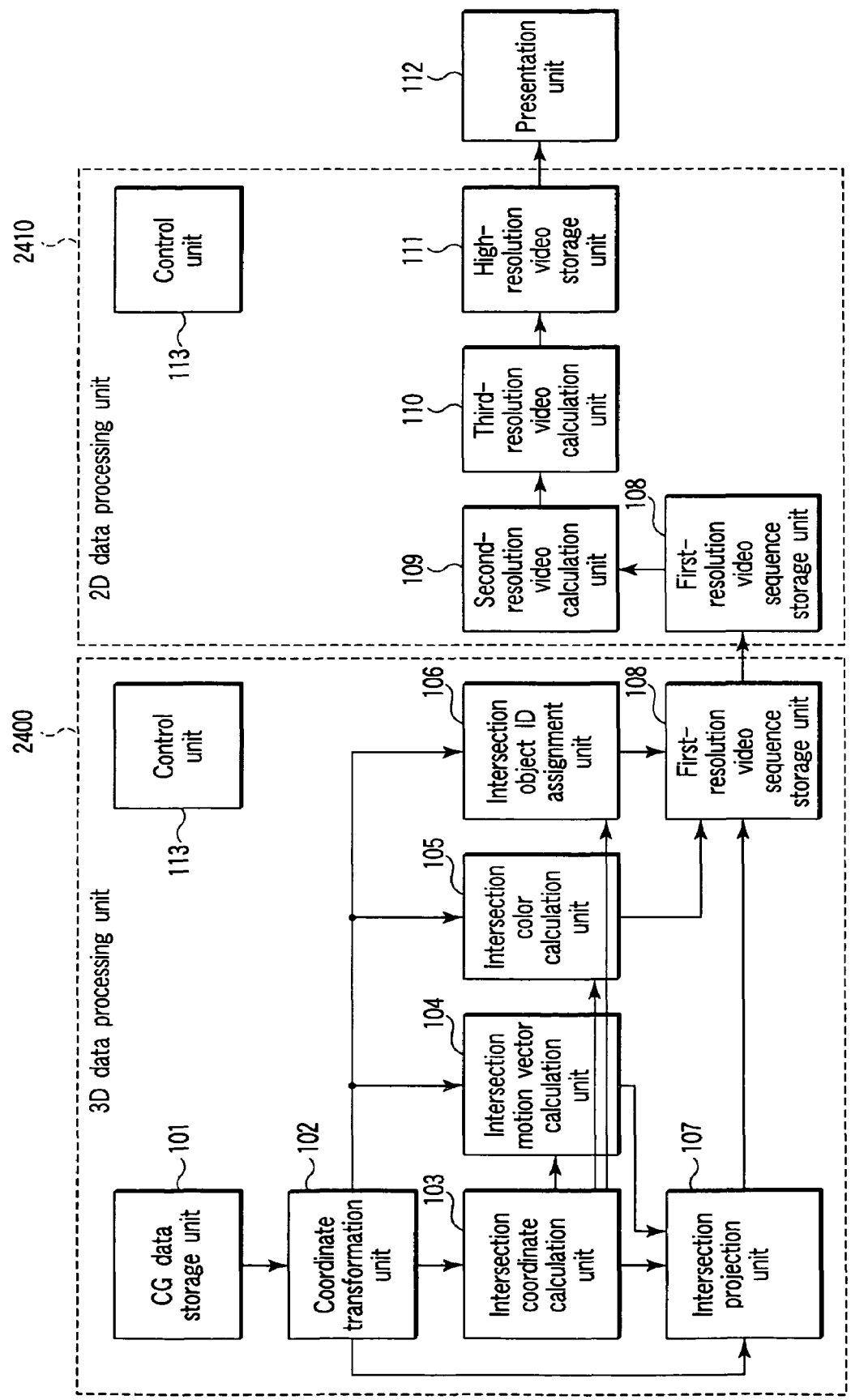
Figure 25:
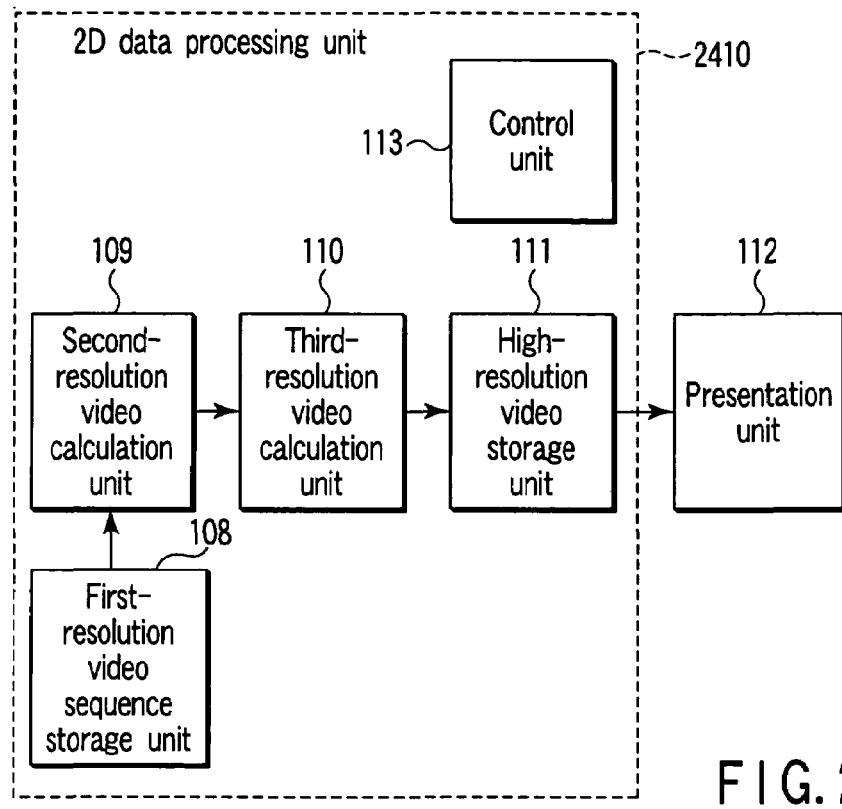
Figure 26:
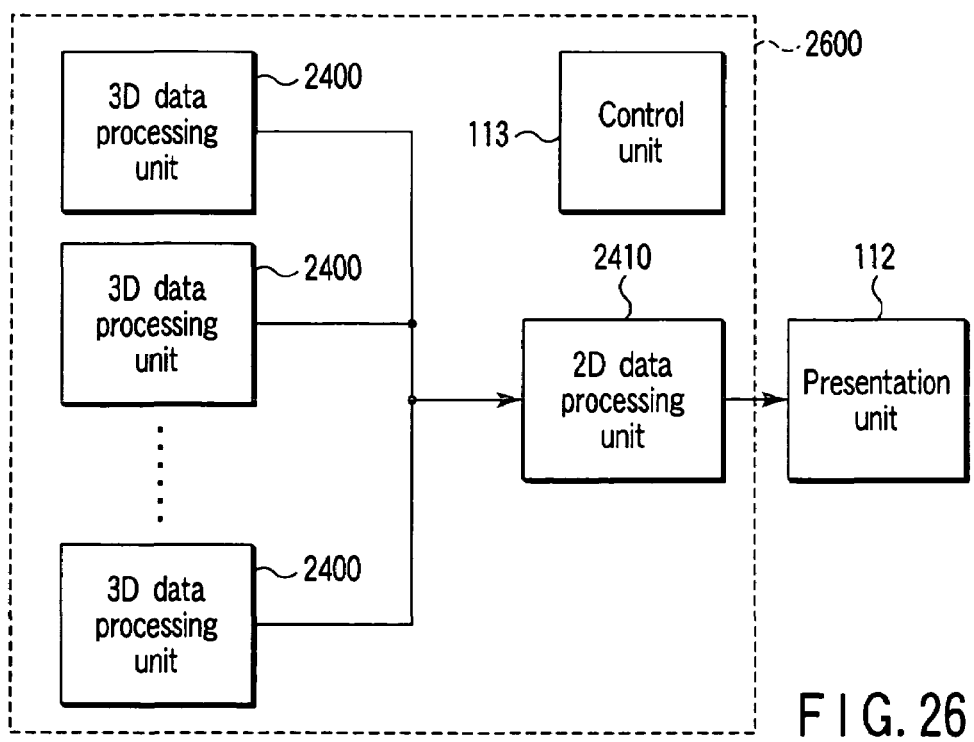
Figure 27:
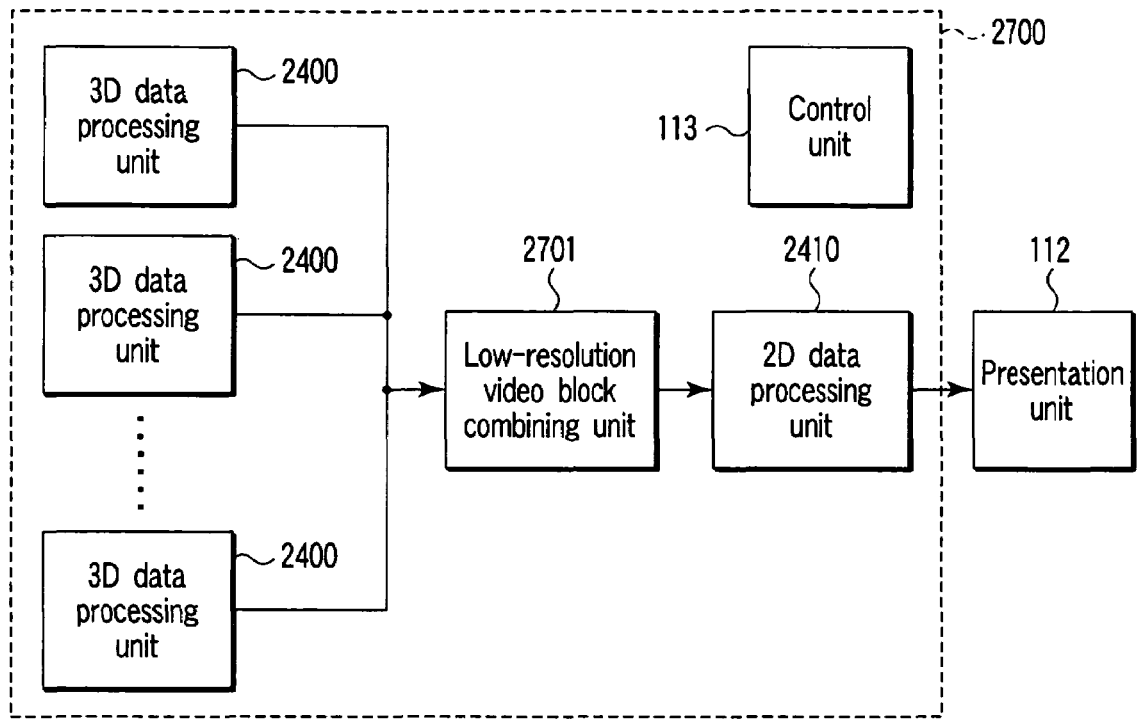
Figure 28:
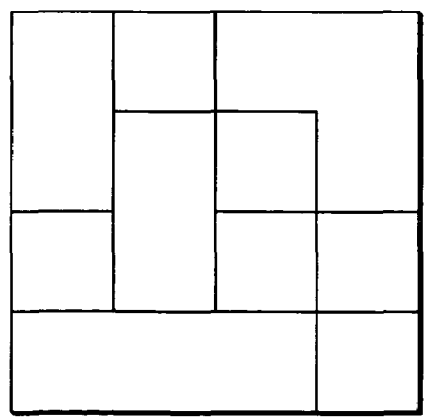
Figure 35:
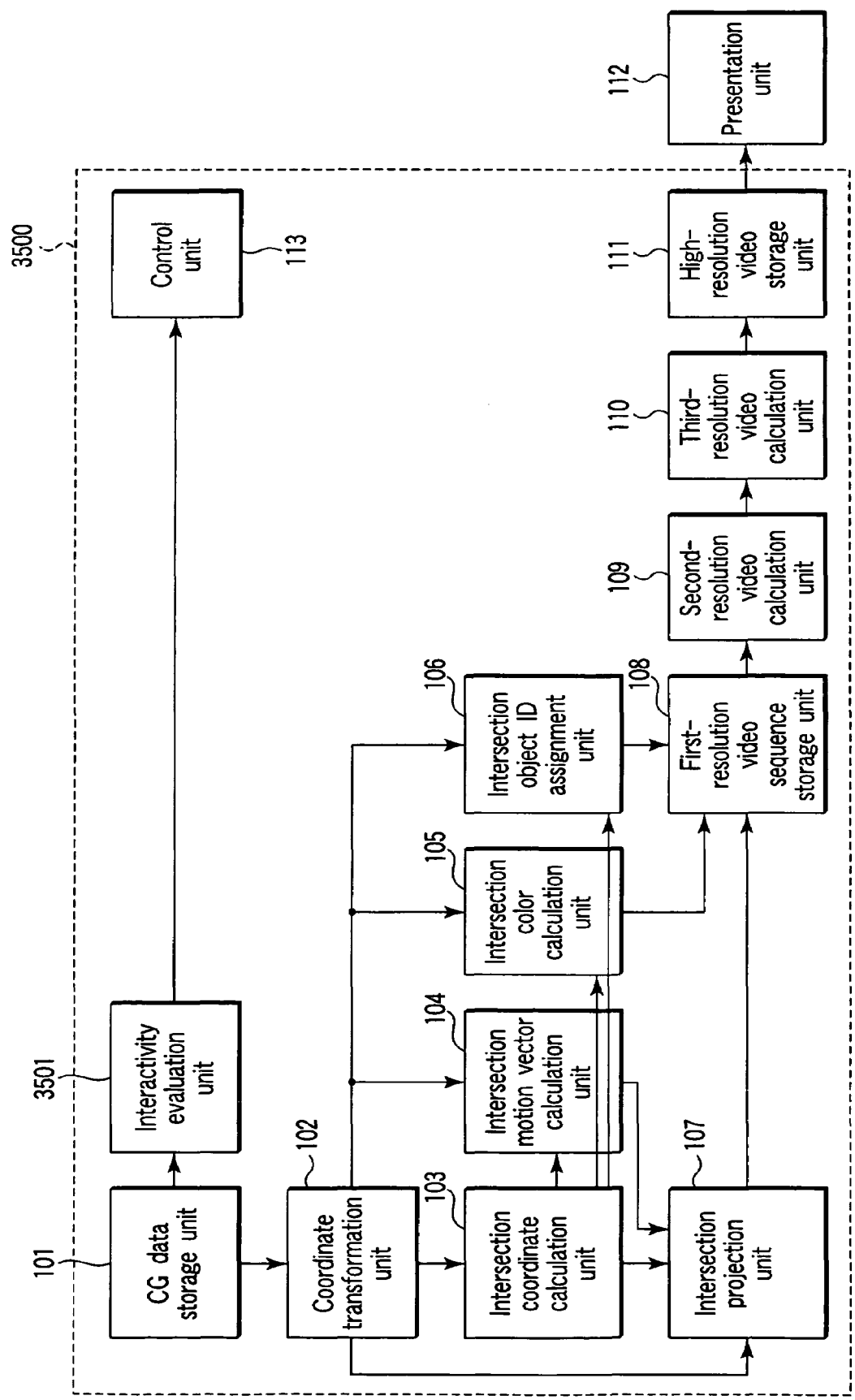

The (a) to (f) of FIG. 15 are views for explaining an intermediate-resolution video data calculation technique in the second-resolution video calculation unit in FIG. 1;

FIG. 16 is a flowchart showing the flow of processing in a third-resolution video calculation unit in FIG. 1;

The (a) to (f) of FIG. 17 are views showing an example of a high-resolution video data calculation technique in the third-resolution video calculation unit in FIG. 1;

FIG. 18 is a view showing 3D motion vectors in the second embodiment of the present invention;

FIG. 19 is a flowchart showing the flow of processing in the second-resolution video calculation unit in FIG. 1 in the second embodiment of the present invention;

The (a) to (f) of FIG. 20 are views for explaining an intermediate-resolution video data in the second-resolution video calculation unit in FIG. 1 in the second embodiment of the present invention;

FIG. 21 is a view showing 3D motion vectors in the third embodiment of the present invention;

FIG. 22 is a flowchart showing the flow of processing in the second-resolution video calculation unit in FIG. 1 in the third embodiment of the present invention;

The (a) to (f) of FIG. 23 are views for explaining an intermediate-resolution video data calculation technique in the second-resolution video calculation unit in FIG. 1 in the third embodiment of the present invention;

FIG. 24 is a block diagram of a video rendering apparatus according to the fourth embodiment of the present invention;

FIG. 25 is a block diagram of a video rendering apparatus according to the fifth embodiment of the present invention;

FIG. 26 is a block diagram of a video rendering apparatus according to the sixth embodiment of the present invention;

FIG. 27 is a block diagram of a video rendering apparatus according to the seventh embodiment of the present invention;

FIG. 28 is a view showing an example of a video block;

FIG. 29 is a block diagram of a video rendering apparatus according to the eighth embodiment of the present invention;

FIG. 30 is a block diagram of a video rendering apparatus according to the ninth embodiment of the present invention;

FIG. 31 is a block diagram of a video rendering apparatus according to the 10th embodiment of the present invention;

FIG. 32 is a block diagram of a video rendering apparatus according to the 11th embodiment of the present invention;

FIG. 33 is a block diagram of a video rendering apparatus according to the 12th embodiment of the present invention;

FIG. 34 is a block diagram of a video rendering apparatus according to the 13th embodiment of the present invention; and FIG. 35 is a block diagram of a video rendering apparatus according to the 16th embodiment of the present invention.

DETAILED DESCRIPTION OF THE INVENTION

Video rendering apparatuses and methods and programs according to the embodiments of the present invention will be described below with reference to the views of the accompanying drawing.

Each embodiment of the present invention has been made in consideration of the above situation, and has as its object to provide a video rendering apparatus and method and a program which interactively render high-quality, high-resolution global illumination videos.

A video rendering apparatus and method and a program according to each embodiment of the present invention can interactively render high-quality, high-resolution global illumination videos.

First Embodiment

Superimposition of Subsequent Frames

A video rendering apparatus according to the first embodiment of the present invention will be described with reference to FIG. 1.

As shown in FIG. 1, the video rendering apparatus according to this embodiment comprises a CG data storage unit 101, coordinate transformation unit 102, intersection coordinate calculation unit 103, intersection motion vector calculation unit 104, intersection color calculation unit 105, intersection object ID assignment unit 106, intersection projection unit 107, first-resolution video sequence storage unit 108, second-resolution video calculation unit 109, third-resolution video calculation unit 110, high-resolution video storage unit 111, presentation unit 112, and control unit 113. Referring to FIG. 1 and subsequent drawings, the presentation unit 112 is not included in the video rendering apparatus, but may be included in it.

The CG data storage unit 101 stores CG data comprising data about coordinate transformation, data about a camera (not shown), data about geometry, data about a light source, data about texture, and the like.

The coordinate transformation unit 102 performs coordinate transformation for the CG data acquired from the CG data storage unit 101 to transform the data into a coordinate system (camera coordinate system) viewed from the line of sight.

The intersection coordinate calculation unit 103 calculates the 3D coordinates of rays and the object by using the CG data after coordinate transformation which is calculated by the coordinate transformation unit 102.

The intersection motion vector calculation unit 104 calculates 3D motion vectors at the intersections of the 3D coordinates, calculated by the intersection coordinate calculation unit 103, by using the CG data after coordinate transformation which is calculated by the coordinate transformation unit 102. The intersection motion vector calculation unit 104 calculates 3D motion vectors at the intersections by interpolation from vertices constituting the polygonal surfaces of an object.

The intersection color calculation unit 105 calculates color values of the intersections at the 3D coordinates, calculated by the intersection coordinate calculation unit 103, by using the CG data after coordinate transformation which is calculated by the coordinate transformation unit 102. The intersection color calculation unit 105 calculates color values of the intersections at the 3D coordinates by interpolation from vertices constituting the polygonal surfaces of the object.

The intersection object ID assignment unit 106 assigns different object IDs to the respective objects at the intersections of the 3D coordinates, calculated by the intersection coordinate calculation unit 103, by using the CG data after coordinate transformation which is calculated by the coordinate transformation unit 102.

The intersection projection unit 107 calculates the 2D coordinates of the intersections and 2D motion vectors at the intersections by projecting the intersections of the 3D coordinates, calculated by the intersection coordinate calculation unit 103, and the 3D motion vectors at the intersections, calculated by the intersection motion vector calculation unit 104, onto a projection plane by using the CG data after coordinate transformation which is calculated by the coordinate transformation unit 102.

The first-resolution video sequence storage unit 108 stores the 2D coordinates of the intersections and the 2D motion vectors at the intersections, calculated by the intersection projection unit 107, the color values of the intersections, calculated by the intersection color calculation unit 105, and the object IDs of the intersections, assigned by the intersection object ID assignment unit 106, together as low-resolution video data in frame.

The second-resolution video calculation unit 109 calculates intermediate-resolution video data by superimposing the low-resolution video data of the current frame, acquired from the first-resolution video sequence storage unit 108, and the low-resolution video data of a plurality of different frames.

The third-resolution video calculation unit 110 calculates high-resolution video data by filtering the intermediate-resolution video data calculated by the second-resolution video calculation unit 109.

The high-resolution video storage unit 111 stores and holds the high-resolution video data calculated by the third-resolution video calculation unit 110 in frame. High-resolution video data is general image data holding the color value of each pixel. As shown in FIG. 1, after the high-resolution video data is written in the high-resolution video storage unit 111 by the third-resolution video calculation unit 110, the presentation unit 112 acquires the high-resolution video data and presents it to a user.

The presentation unit 112 presents the high-resolution video data acquired from the high-resolution video storage unit 111 to the user. The presentation unit 112 is comprised of a display or the like which can present high-resolution video data to the user.

Assume that in this embodiment, all the blocks are controlled by the single control unit 113.

The detailed operation of each block of the video rendering apparatus in FIG. 1 and the structure of data flowing between blocks will be described below with reference to FIGS. 2 to 17.

[CG Data Storage Unit 101]

An example of the CG data held in the CG data storage unit 101 will be described with reference to FIG. 2. As shown in FIG. 2, the CG data contains coordinate transformation data, camera data, geometry data, light source data, and texture data.

Coordinate transformation data is data about coordinate transformation of a world matrix, view matrix, projection matrix, viewport scaling matrix, and the like.

Camera data is data about a camera such as a view volume (view pyramid).

Geometry data is data about geometry such as the 3D coordinates of vertices constituting the polygonal surfaces of an object, the index values of the vertices, 3D motion vectors at the vertices, color values of the vertices, the texture coordinates of the vertices, normal vectors at the vertices, and the object IDs of the vertices.

Light source data is data about a light source such as the type of light source, the 3D coordinates of the light source, and the color value of the light source.

Texture data is data about a texture image.

Of the CG data, the 3D coordinates of the vertices, the 3D motion vectors at the vertices, the normal vectors at the vertices, and the 3D coordinates of the light source shown in FIG. 3 are defined in unique local coordinate systems, respectively, a common world coordinate system, or a camera coordinate system with a camera position being an origin. These data are coordinate-transformed into the camera coordinate system by the coordinate transformation unit 102, and then are sent to the subsequent blocks.

CG data other than those shown in FIG. 3 are sent to the subsequent blocks without being processed by the coordinate transformation unit 102.

In general, the values of vertex coordinates and light source coordinates are expressed by 3D coordinates XYZ or homogeneous coordinates XYZW. In this specification, however, they are generically called 3D coordinates.

Figure 4:
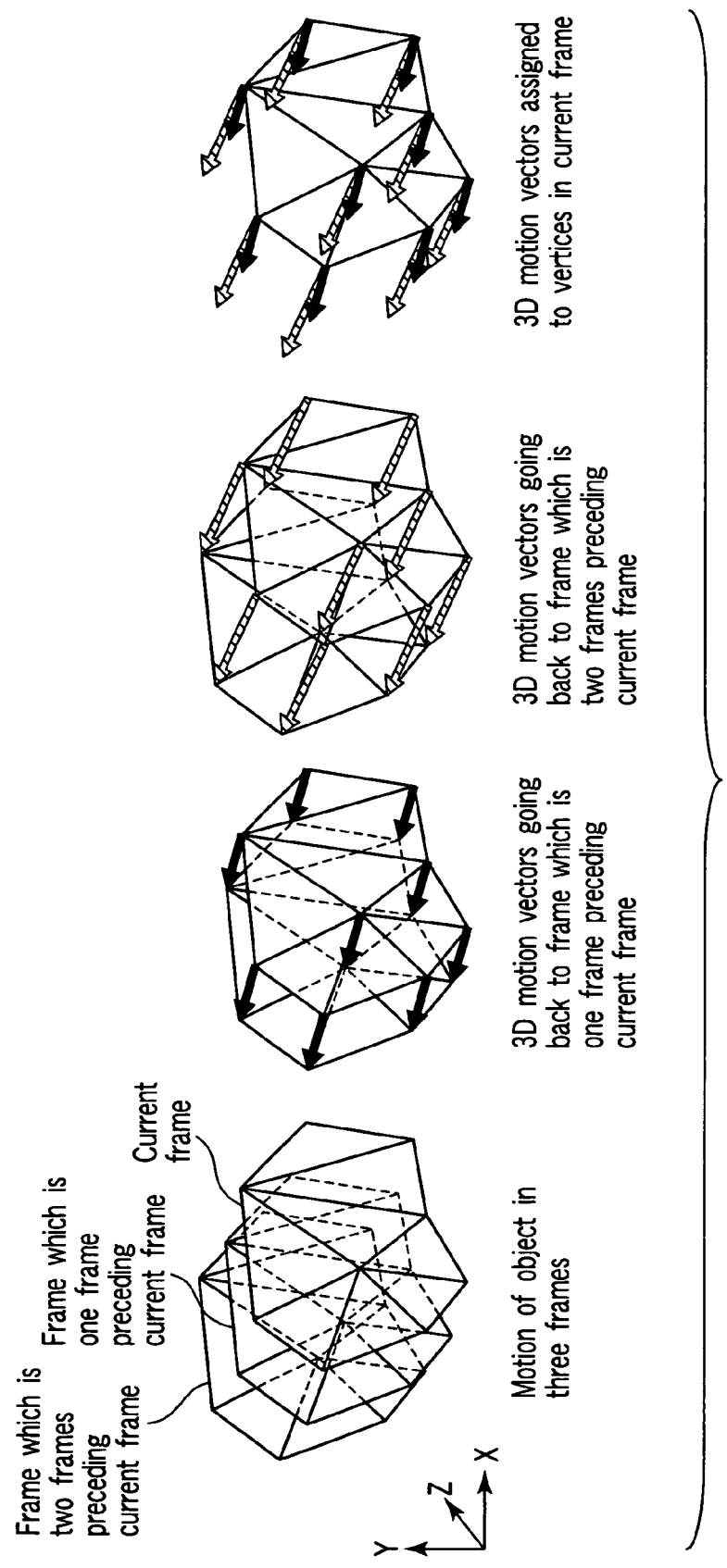
FIG. 4 is a view showing 3D motion vectors in the first embodiment of the present invention.

Note that a 3D motion vector at a vertex is a vector connecting the 3D coordinates of the vertex in the current frame and the 3D coordinates of the corresponding vertex in a different frame. This vector represents the temporal motion of the vertex. As shown in FIG. 4, in this embodiment, the respective vertices in the current frame are assigned in advance a plurality of vectors as attributes, which represent backward motions to the corresponding positions in a plurality of frames temporally preceding the current frame. These vectors are held in the CG data storage unit 101.

Figure 5:
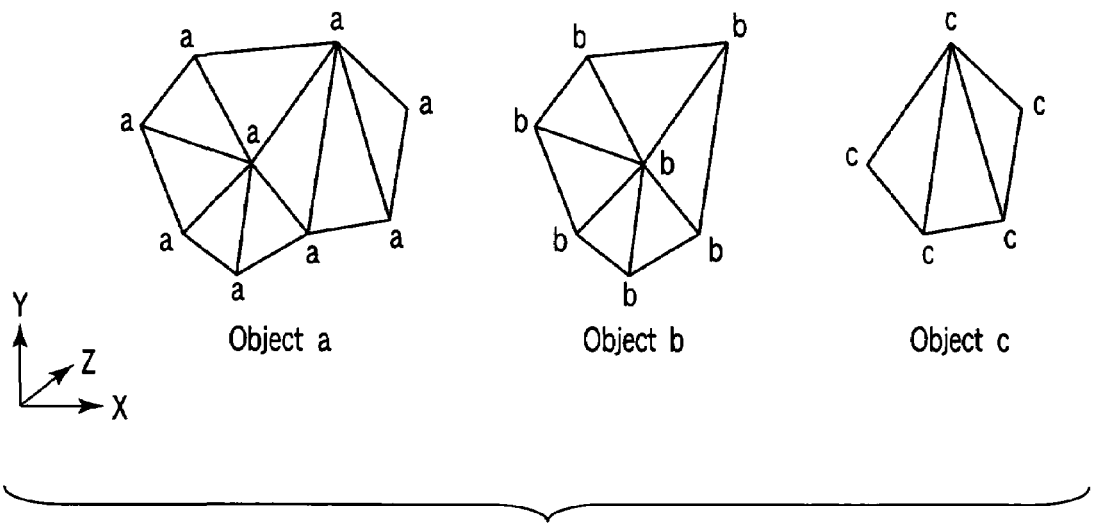
FIG. 5 is a view showing the object IDs of vertices.

As shown in FIG. 5, the object ID of a vertex is an ID for uniquely identifying an object including a polygonal surface to which the vertex belongs. Such an ID is assigned to each vertex in advance and is held in the CG data storage unit 101. For example, as shown in FIG. 5, the object ID of each vertex of an object a is "a".

FIG. 1 shows the CG data storage unit 101, first-resolution video sequence storage unit 108, and high-resolution video storage unit 111 as different blocks. However, they may be integrated on a single memory or may be separately arranged on a plurality of memories having different capacities and access speeds. In addition, the CG data held in the CG data storage unit 101 is not limited to the form shown in FIG. 2, and may include all data necessary to render a desired CG image.

[Coordinate Transformation Unit 102]

Figure 6:
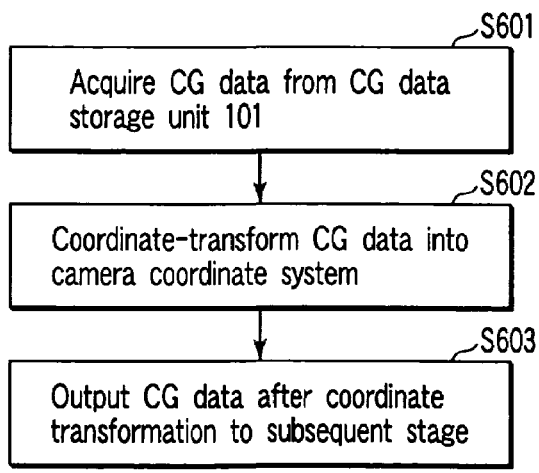
FIG. 6 is a flowchart showing the flow of processing in the coordinate transformation unit in FIG. 1.

The processing flow in the coordinate transformation unit 102 will be described with reference to FIG. 6.

In first step S601, the CG data held in the CG data storage unit 101 is acquired.

In step S602, of the CG data acquired in step S601, the 3D coordinates of the vertices, the 3D motion vectors at the vertices, the normal vectors at the vertices, and the 3D coordinates of the light source shown in FIG. 3 are multiplied by the world matrix and view matrix contained in the CG data to transform the coordinate system into a camera coordinate system.

A matrix multiplication technique is determined based on the coordinate system in which CG data as transformation target data is defined. If the CG data is defined in the local coordinate system, both the world matrix and the view matrix are multiplied in this order. If the CG data is defined in the world coordinate system, only the view matrix is multiplied. If the CG data is defined in the camera coordinate system from the beginning, nothing is performed in step S602.

In step S603, the CG data which has undergone coordinate transformation in step S602 and the remaining CG data (CG data other than coordinate transformation target data) are output to the intersection coordinate calculation unit 103, intersection motion vector calculation unit 104, intersection color calculation unit 105, intersection object ID assignment unit 106, and intersection projection unit 107.

[Intersection Coordinate Calculation Unit 103]

Figure 7:
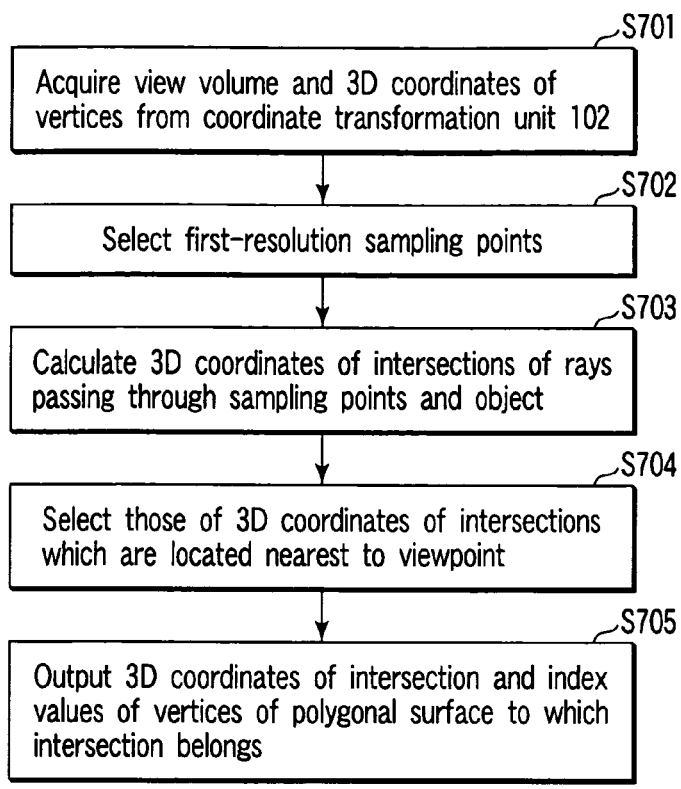
FIG. 7 is a flowchart showing the flow of processing in an intersection coordinate calculation unit in FIG. 1.

The processing flow in the intersection coordinate calculation unit 103 will be described with reference to FIG. 7.

In first step S701, the view volume and the 3D coordinates of the vertices contained in the CG data sent from the coordinate transformation unit 102 are acquired.

In step S702, the front clip plane of the view volume acquired in step S701 is regarded as an image plane having the same resolution as that of the high-resolution video finally presented to the presentation unit 112, and an appropriate number of pixels are selected as low-resolution (first resolution) sampling points from the image plane.

As described above, contrivances concerning sampling point selection techniques have already been proposed in, for example, K. Bala, B. Walter, and D. P. Greenberg, "Combining Edges and Points for Interactive High-Quality Rendering", SIGGRAPH2003. Assume that in the embodiment of the present invention, sampling points are selected by using a technique similar to these conventional techniques. For this reason, a detailed description of the sampling point selection technique will be omitted.

In step S703, the intersections of the 3D coordinates of line-of-sight vectors (rays) passing through the sampling points selected in step S702 and the polygonal surfaces constituting the object are calculated by referring to the 3D coordinates of the vertices acquired in step S701.

It is known that this calculation requires a very large processing amount. Various contrivances for increasing the processing speed have already been proposed. In this embodiment of the present invention, calculation is performed by using a technique similar to these conventional techniques. For this reason, a detailed description of the calculation technique will be omitted.

In step S704, of the intersections of the 3D coordinates of the rays and the object which are calculated in step S703, the 3D coordinates of the intersection located nearest to the viewpoint are selected.

In step S705, the 3D coordinates of the intersection of the ray and the object which are selected in step S704 and index values assigned to the vertices of the polygonal surface to which the intersection belongs are output to the intersection motion vector calculation unit 104, intersection color calculation unit 105, intersection object ID assignment unit 106, and intersection projection unit 107.

[Intersection Motion Vector Calculation Unit 104]

Figure 8:
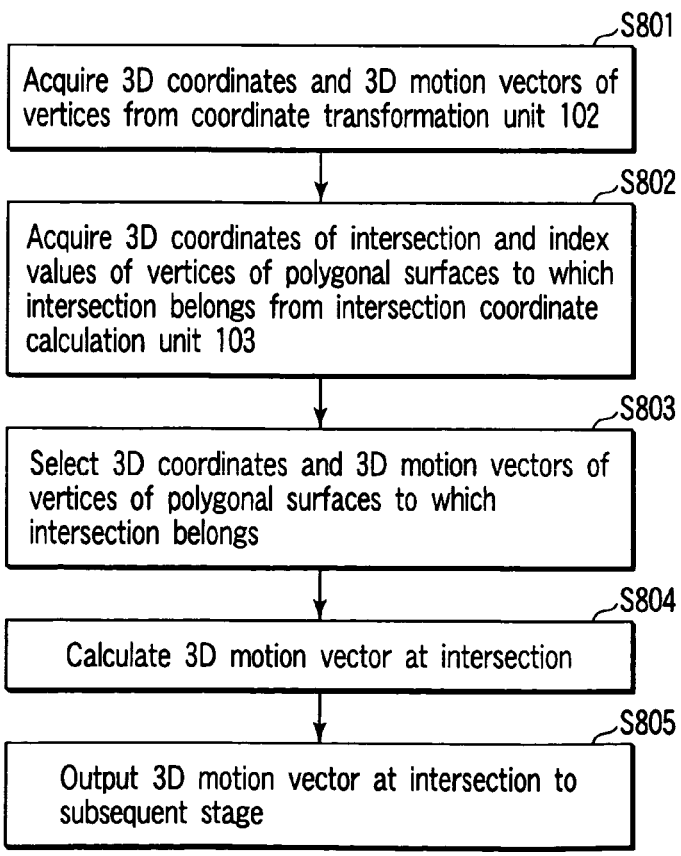
FIG. 8 is a flowchart showing the flow of processing in an intersection motion vector calculation unit in FIG. 1.

The processing flow in the intersection motion vector calculation unit 104 will be described with reference to FIG. 8.

In first step S801, the 3D coordinates of the vertices and the 3D motion vectors at the vertices which are contained in the CG data sent from the coordinate transformation unit 102 are acquired.

In step S802, the 3D coordinates of the intersection of the ray and the object and the index values indicating the vertices of the polygonal surface to which the intersection belongs, which are sent from the intersection coordinate calculation unit 103, are acquired.

In step S803, 3D coordinates and 3D motion vectors constituting the polygonal surface to which the intersection of the ray and the object belongs are selected from the 3D coordinates of the vertices and the 3D motion vectors at the vertices, acquired in step S801, by using the index values of the vertices acquired in step S802.

In step S804, 3D motion vectors at intersections are calculated by interpolating the 3D motion vectors at the vertices selected in step S803 using the 3D coordinates of the intersection of the ray and the object acquired in step S802 and the 3D coordinates of the vertices selected in step S803.

In step S805, the 3D motion vectors at the intersections calculated in step S804 are output to the intersection projection unit 107.

[Intersection Color Calculation Unit 105]

Figure 9:
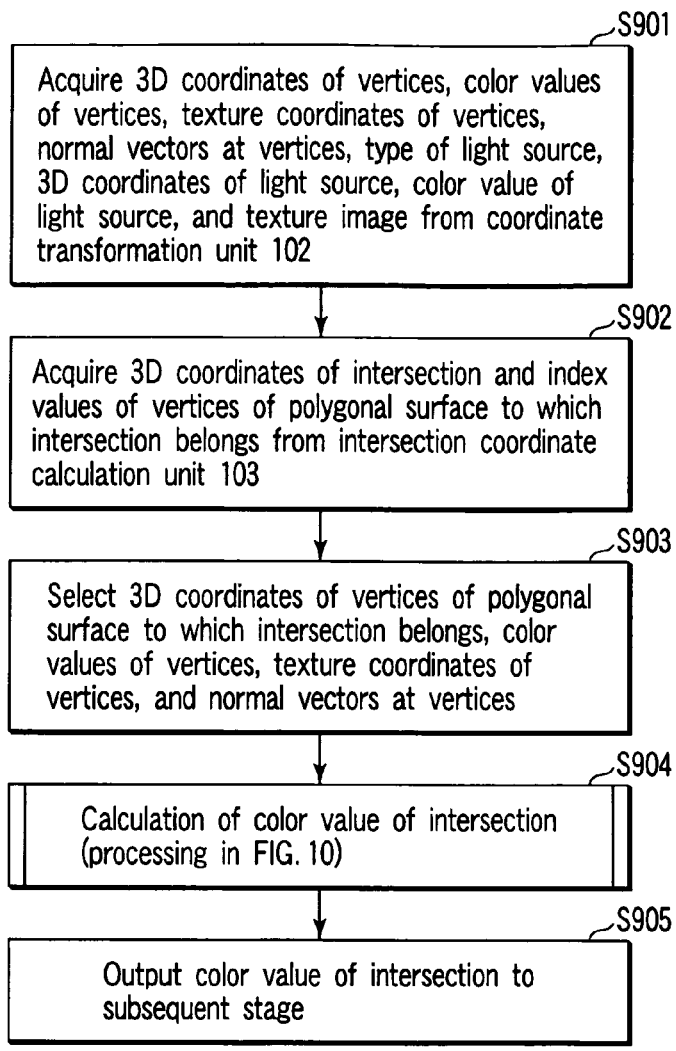
FIG. 9 is a flowchart showing the flow of processing in an intersection color calculation unit in FIG. 1.

The processing flow in the intersection color calculation unit 105 will be described with reference to FIG. 9.

In first step S901, the 3D coordinates of the vertices, the color values of the vertices, the texture coordinates of the vertices, the normal vectors at the vertices, the type of light source, the 3D coordinates of the light source, the color value of the light source, and the texture data contained in the CG data sent from the coordinate transformation unit 102 are acquired.

In step S902, the 3D coordinates of the intersection of the ray and the object and the index values indicating the vertices of the polygonal surface to which the intersection belongs, which are sent from the intersection coordinate calculation unit 103, are acquired.

In step S903, data constituting the polygonal surface to which the intersection of the ray and the object belongs are selected from the 3D coordinates of the vertices, the color values of the vertices, the texture coordinates of the vertices, and the normal vectors at the vertices, which are acquired in step S901, by using the index values of the vertices acquired in step S902.

In step S904, the color value of the intersection is calculated by using the type of light source, the 3D coordinates of the light source, the color value of the light source, and the texture data acquired in step S901, the 3D coordinates of the intersection of the ray and the object acquired in step S902, and the 3D coordinates of the vertices, the color values of the vertices, the texture coordinates of the vertices, and the normal vectors at the vertices selected in step S903. The calculation of the color values of the intersection will be described in detail later with reference to FIG. 10.

In step S905, the color value of the intersection calculated in step S904 is output to the first-resolution video sequence storage unit 108.

Figure 10:
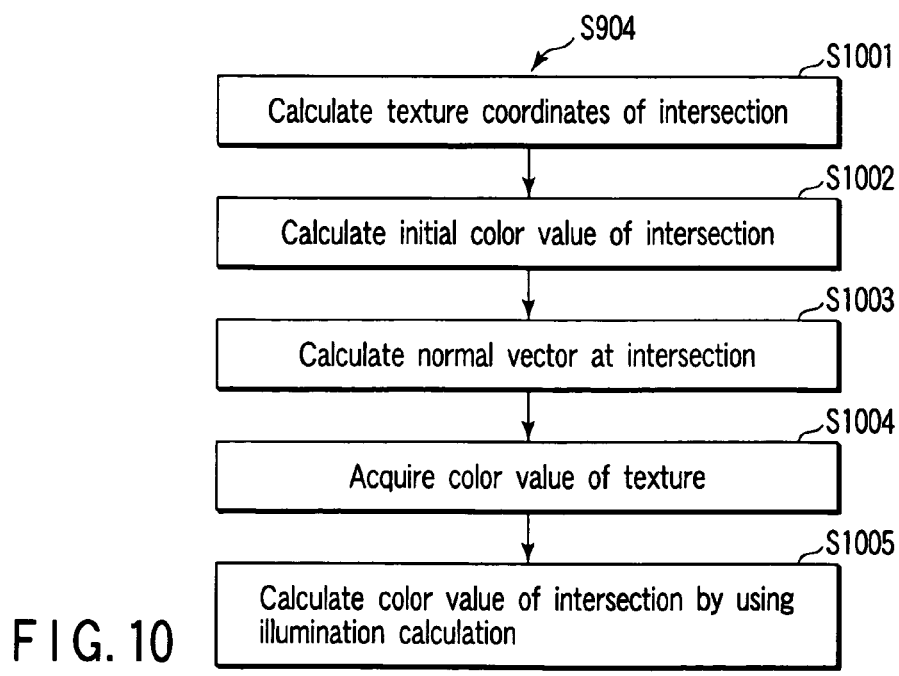
FIG. 10 is a flowchart showing an intersection color calculation method performed by the intersection color calculation unit in FIG. 1.

A typical example of the processing flow for the calculation of the color value of an intersection in step S904 will be described next with reference to FIG. 10.

In first step S1001, the texture coordinates of the intersection are calculated by interpolating the texture coordinates of the vertices of the polygonal surface to which the intersection belongs.

In step S1002, the initial color value of the intersection is calculated by interpolating the color values of the vertices of the polygonal surface to which the intersection belongs.

In step S1003, the normal vector at the intersection is calculated by interpolating the normal vectors at the vertices of the polygonal surface to which the intersection belongs.

In step S1004, the color value of texture is acquired by referring to the texture data at the texture coordinates calculated in step S1001.

In step S1005, the color value of the intersection calculated in step S1002 is changed in consideration of the normal vector at the intersection calculated in step S1003, the color value of texture acquired in step S1004, and the influence of light from the light source. In this case, a global illumination effect is realized by considering the influence of indirect light from other polygonal surfaces around the polygonal surface to which the vertices belong.

There are several types of indirect light calculation techniques in global illumination, and various contrivances have already been proposed. Assume that in the embodiment of the present invention, indirect light is calculated by using a technique similar to these conventional techniques. A detailed description of the indirect light calculation technique will therefore be omitted. The technique of calculating the color value of an intersection in FIG. 10 is merely an example, and the calculation technique to be used in the present invention is not limited to this technique.

[Intersection Object ID Assignment Unit 106]

Figure 11:
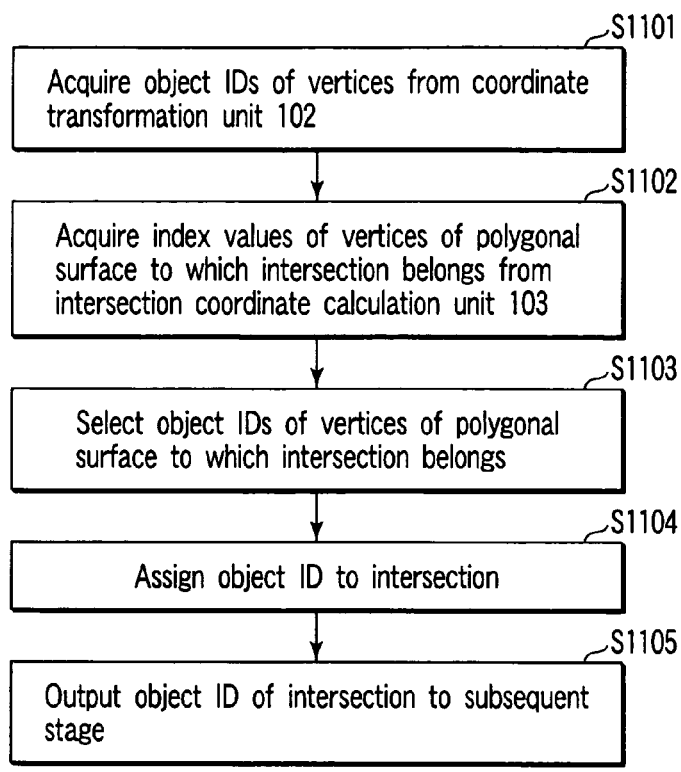
FIG. 11 is a flowchart showing the flow of processing in an intersection object ID assignment unit in FIG. 1.

The processing flow in the intersection object ID assignment unit 106 will be described with reference to FIG. 11.

In first step S1101, the object IDs of the vertices contained in the CG data sent from the coordinate transformation unit 102 are acquired.

In step S1102, index values indicating the vertices of the polygonal surface to which the intersection of the ray and the object belongs, sent from the intersection coordinate calculation unit 103, are acquired.

In step S1103, of the object IDs of the vertices acquired in step S1101, the object IDs of the vertices constituting the polygonal surface to which the intersection of the ray and the object belongs are selected by using the index values of the vertices acquired in step S1102.

In step S1104, the object ID of the vertex selected in step S1103 is assigned as the object ID of the intersection.

In step S1105, the object ID of the intersection assigned in step S1104 is output to the first-resolution video sequence storage unit 108.

[Intersection Projection Unit 107]

Figure 12:
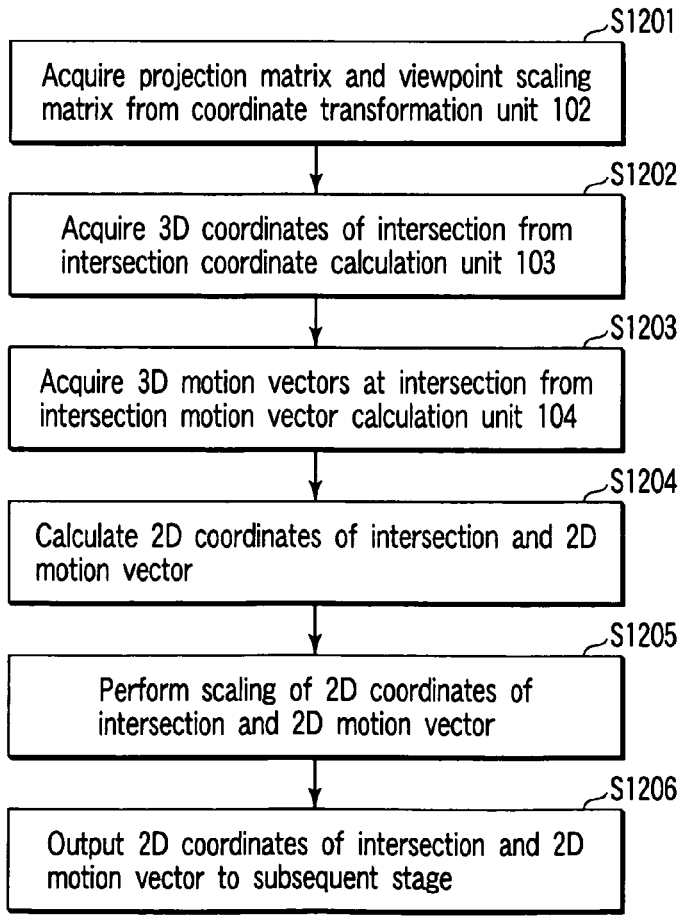
FIG. 12 is a flowchart showing the flow of processing in an intersection projection unit in FIG. 1.

The processing flow in the intersection projection unit 107 will be described with reference to FIG. 12.

In first step S1201, the projection matrix and viewport scaling matrix contained in the CG data sent from the coordinate transformation unit 102 are acquired.

In step S1202, the 3D coordinates of the intersection of the ray and the object sent from the intersection coordinate calculation unit 103 are acquired.

In step S1203, the 3D motion vector at the intersection of the ray and the object sent from the intersection motion vector calculation unit 104 is acquired.

In step S1204, the 2D coordinates of the intersection and a 2D motion vector at the intersection are calculated by multiplying the 3D coordinates of the intersection acquired in step S1202 and the 3D motion vector at the intersection acquired in step S1203 by the projection matrix acquired in step S1201 and projecting the resultant data onto a projection plane.

In step S1205, the 2D coordinates of the intersection and the 2D motion vector at the intersection are translated to proper positions on an image plane by multiplying the 2D coordinates of the intersection and the 2D motion vector at the intersection calculated in step S1204 by the viewport scaling matrix acquired in step S1201.

In step S1206, the 2D coordinates of the intersection and the 2D motion vector at the intersection calculated in step S1205 are output to the first-resolution video sequence storage unit 108. Note that these data are output in the form of floating point numbers or fixed point numbers.

[First-Resolution Video Sequence Storage Unit 108]

An example of the low-resolution video data held in the first-resolution video sequence storage unit 108 will be described with reference to FIG. 13.

As is obvious from FIG. 13, as the low-resolution video data, the 2D coordinates of the intersections of rays passing through the respective sampling points and the object, 2D motion vectors at the intersections, color values of the intersections, and the object IDs of the intersections are held together in frame. Referring to FIG. 13, reference symbol $n_k$ denotes the number of intersections of a frame k.

As shown in FIG. 1, the data concerning these intersections are sent from the intersection projection unit 107, intersection color calculation unit 105, and intersection object ID assignment unit 106.

Note that the low-resolution video data held in the first-resolution video sequence storage unit 108 are not limited to the form shown in FIG. 13, and may include all data necessary to render a desired CG image.

[Second-Resolution Video Calculation Unit 109]

Figure 14:
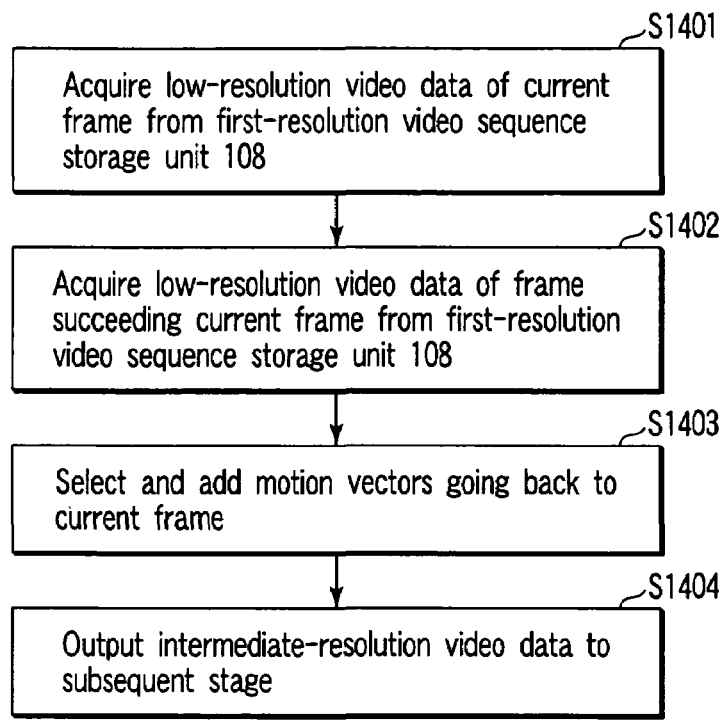
FIG. 14 is a flowchart showing the flow of processing in a second-resolution video calculation unit in FIG. 1.

The processing flow in the second-resolution video calculation unit 109 will be described with reference to FIG. 14.

In first step S1401, the 2D coordinates of the intersections and 2D motion vectors at the intersections which are contained in the low-resolution (first resolution) video data of the current frame are acquired from the first-resolution video sequence storage unit 108.

In step S1402, as shown in (a) to (c) of FIG. 15, the 2D coordinates of the intersections and 2D motion vectors at the intersections which are contained in the low-resolution video data of a plurality of fames temporally succeeding the current frame are acquired.

In step S1403, as shown in (d) and (e) of FIG. 15, the low-resolution video data of a plurality of frames temporally succeeding the current frame are superimposed on the low-resolution video data of the current frame by selecting and adding 2D motion vectors representing backward motions to the current frame from a plurality of 2D motion vectors assigned to the respective intersections contained in the low-resolution video data of the frames temporally succeeding the current frame which are acquired in step S1402. For example, in the case shown in (a) to (f) of FIG. 15, the intermediate-resolution video data in (f) of FIG. 15 is obtained by superimposing the low-resolution video data in (a) of FIG. 15, the low-resolution video data in (d) of FIG. 15, and the low-resolution video data in (e) of FIG. 15. In this case, the resolution of the data in (f) of FIG. 15 is three times higher than that of the data in (a) of FIG. 15. Note that low-resolution video data obtained by superimposition will be called intermediate-resolution (second resolution) video data in this specification.

In this case, flag value 0 is assigned to each low-resolution video data initially contained in the current frame, and flag value 1 is assigned to each low-resolution video data newly superimposed on the current frame.

In step S1404, the intermediate-resolution video data calculated in step S1403 is output to the third-resolution video calculation unit 110.

[Third-Resolution Video Calculation Unit 110]

The processing flow in the third-resolution video calculation unit 110 will be described with reference to FIG. 16.

In first step S1601, the intermediate-resolution (second resolution) video data sent from the second-resolution video calculation unit 109 is acquired.

In step S1602, a color buffer having the same resolution as that of the high-resolution video presented to the presentation unit 112 is ensured in the high-resolution video storage unit 111.

In step S1603, as shown in (a) and (b) of FIG. 17, intersections located in the neighboring area of each respective pixel in the high-resolution color buffer ensured in step S1602 are selected ((b) of FIG. 17) from the intersections contained in the intermediate-resolution video data ((a) of FIG. 17) acquired in step S1601.

As described above, contrivances concerning the selection of tap positions for filtering have already been proposed in, for example, K. Bala, B. Walter, and D. P. Greenberg, "Combining Edges and Points for Interactive High-Quality Rendering", SIGGRAPH2003. In this embodiment of the present invention as well, the selection technique in (a) and (b) of FIG. 17 is merely an example, and intersections used for filtering may be selected by using a technique similar to the conventional technique.

The intersections selected here are obtained by superimposing intersections sampled in a plurality of temporally different frames. For this reason, when the visibility of an object changes due to the movement of the object and camera between frames, intersections belonging to the object which should not be depicted in the current frame may be included. In the subsequent steps, therefore, processing is performed to remove such intersections from filtering targets.

In step S1604, of the intersections selected in step S1603, intersections assigned flag value 1 are selected (which correspond to the hatched circles in (a) to (f) of FIG. 17).

As described above, this flag value is assigned to each intersection by the second-resolution video calculation unit 109. Flag value 0 is assigned to each intersection initially contained in the current frame, and flag value 1 is assigned to each intersection which is superimposed from a frame different from the current frame onto the current frame.

In step S1605, intersections assigned flag value 0 which are located in the neighboring area of each intersection assigned flag value 1 and selected in step S1604 are selected ((c) to (f) of FIG. 17). The sizes of the neighboring area shown in FIG. 17B and the neighboring area shown in (c) to (f) of FIG. 17 depend on the object.

In step S1606, as shown in (c) to (f) of FIG. 17, the object IDs of the intersections assigned flag value 1 and selected in step S1604 are compared with those of the neighboring intersections assigned flag value 0 and selected in step S1605. If at least one mismatch is detected, the intersections assigned with flag value 1 are removed from the filtering targets ((f) of FIG. 17).

In step S1607, the color values of the respective pixels in the high-resolution color buffer ensured in step S1602 are calculated by interpolating the color values of the remaining intersections, which are not removed in step S1606, upon adding proper weights to the color values.

[High-Resolution Video Storage Unit 111]

The high-resolution video storage unit 111 stores high-resolution video data. The high-resolution video data is general image data which holds the color value of each pixel. As shown in FIG. 1, after the high-resolution video data is written by the third-resolution video calculation unit 110, the data is acquired from the presentation unit 112 and presented to the user.

As described above, according to the video rendering apparatus of this embodiment, the low-resolution sampling points in a plurality of frames temporally succeeding the current frame can be quickly and stably superimposed on the current frame by using motion vectors at low-resolution sampling points and object IDs which are obtained when a CG image is to be rendered.

This makes it possible to decrease the number of sampling points per frame as compared with the prior art. As a result, a high-quality, high-resolution global illumination video can be interactively rendered.

Second Embodiment

Superimposition of Preceding Frames

The arrangement of a video rendering apparatus according to the second embodiment is the same as that in the first embodiment shown in FIG. 1. However, the contents of CG data held in a CG data storage unit 101 and the contents of processing in a second-resolution video calculation unit 109 differ from those in the first embodiment. The same reference numerals as those of the units of the apparatus which have been described above denote the same units in the following description, and a description thereof will be omitted.

[CG Data Storage Unit 101]

As shown in FIG. 18, in this embodiment, the respective vertices in the current frame are assigned in advance a plurality of vectors as attributes, which represent forward motions to the corresponding positions in a plurality of frames temporally succeeding the current frame. These vectors are stored and held in the CG data storage unit 101.

[Second-Resolution Video Calculation Unit 109]

The processing flow in the second-resolution video calculation unit 109 in this embodiment will be described with reference to FIG. 19.

In first step S1901, the 2D coordinates of intersections and 2D motion vectors at the intersections contained in the low-resolution video data of the current frame are acquired from a first-resolution video sequence storage unit 108.

In step S1902, as shown in (a) to (d) of FIG. 20 coordinates of intersections and 2D motion vectors at the intersections contained in the low-resolution video data of a plurality of frames temporally preceding the current frame are acquired.

In step S1903, as shown in (d) and (e) of FIG. 20, the low-resolution video data of the plurality of frames temporally preceding the current frame are superimposed on the low-resolution video data of the current frame by selecting and adding 2D motion vectors representing forward motions to the current frame from a plurality of 2D motion vectors assigned to the respective intersections contained in the low-resolution video data of the plurality of frames temporally preceding the current frame which are acquired in step S1902. For example, in the case shown in (a) to (f) of FIG. 20, the intermediate-resolution video data in (f) of FIG. 20 is obtained by superimposing the low-resolution video data in (c) of FIG. 20, the low-resolution video data in (d) of FIG. 20, and the low-resolution video data in (e) of FIG. 20. In this case, the resolution of the data in (f) of FIG. 20 is three times higher than that of the data in (a) of FIG. 20.

In this case, flag value 0 is assigned to the low-resolution video data initially contained in the current frame, and flag value 1 is assigned to the low-resolution video data newly superimposed on the current frame.

In step S1904, the intermediate-resolution video data calculated in step S1903 is output to a third-resolution video calculation unit 110.

As described above, according to the video rendering apparatus of this embodiment, low-resolution sampling points in a plurality of frames temporally preceding the current frame can be quickly and stably superimposed on the current frame by using motion vectors at the low-resolution sampling points and object IDs which are obtained when a CG image is rendered.

This makes it possible to decrease the number of sampling points per frame as compared with the prior art. As a consequence, a high-quality, high-resolution global illumination video can be interactively rendered.

Third Embodiment

Superimposition of Preceding and Succeeding Frames

The arrangement of a video rendering apparatus according to the third embodiment is the same as that of the first embodiment in FIG. 1. However, the contents of CG data held in a CG data storage unit 101 and the contents of processing in a second-resolution video calculation unit 109 differ from those in the first embodiment.

[CG Data Storage Unit 101]

As shown in FIG. 21, in this embodiment, the respective vertices in the current frame are assigned in advance a plurality of vectors as attributes, which represent backward motions to the corresponding positions in a plurality of frames temporally preceding the current frame, and a plurality of vectors as attributes, which represent forward motions to the corresponding positions in a plurality of frames temporally succeeding the current frame. These vectors are stored and held in the CG data storage unit 101.

[Second-Resolution Video Calculation Unit 109]

The processing flow in the second-resolution video calculation unit 109 in this embodiment will be described with reference to FIG. 22.

In first step S2201, the 2D coordinates of intersections and 2D motion vectors at the intersections contained in the low-resolution video data of the current frame are acquired from a first-resolution video sequence storage unit 108.

In step S2202, as shown in (a) to (c) of FIG. 23, the 2D coordinates of intersections and 2D motion vectors at the intersections contained in the low-resolution video data of a plurality of frames temporally succeeding the current frame and the 2D coordinates of intersections and 2D motion vectors at the intersections contained in the low-resolution video data of a plurality of frames temporally preceding the current frame are acquired.

In step S2203, as shown in (d) and (e) of FIG. 23, the low-resolution video data of the plurality of frames temporally succeeding the current frame and the low-resolution video data of the plurality of frames temporally preceding the current frame are superimposed on the low-resolution video data of the current frame by selecting and adding 2D motion vectors representing motions to the current frame from a plurality of 2D motion vectors assigned to the respective intersections contained in the low-resolution video data of the plurality of frames temporally succeeding the current frame and the respective intersections contained in the low-resolution video data of the plurality of frames temporally preceding the current frame which are acquired in step S2202. For example, in the case shown in (a) to (f) of FIG. 23, the intermediate-resolution video data in FIG. 23F is obtained by superimposing the low-resolution video data in (b) of FIG. 23, the low-resolution video data in (d) of FIG. 23, and the low-resolution video data in (e) of FIG. 23. In this case, the resolution of the data in (f) of FIG. 23 is three times higher than that of the data in (b) of FIG. 23.

In this case, flag value 0 is assigned to the low-resolution video data initially contained in the current frame, and flag value 1 is assigned to the low-resolution video data newly superimposed on the current frame.

In step S2204, the intermediate-resolution video data calculated in step S2203 is output to a third-resolution video calculation unit 110.

As described above, according to the video rendering apparatus of this embodiment, low-resolution sampling points in a plurality of frames temporally succeeding the current frame and low-resolution sampling points in a plurality of frames temporally preceding the current frame can be quickly and stably superimposed on the current frame by using motion vectors at the low-resolution sampling points and object IDs which are obtained when a CG image is rendered.

This makes it possible to decrease the number of sampling points per frame as compared with the prior art. As a consequence, a high-quality, high-resolution global illumination video can be interactively rendered.

Fourth Embodiment

Asynchronous Parallel Operation (Parallel Operation of 3D Data Processing Unit and 2D Data Processing Unit)

FIG. 24 shows the arrangement of a video rendering apparatus. As is obvious from FIG. 24, the video rendering apparatus of this embodiment is characterized in that the video rendering apparatus according to the first, second, or third embodiment in FIG. 1 is divided into two processing units, i.e., a 3D data processing unit 2400 and a 2D data processing unit 2410, and asynchronous parallel operation of the respective processing units is performed by control units 113 which the processing units have as dedicated units.

The 3D data processing unit 2400 and 2D data processing unit 2410 exchange data through first-resolution video sequence storage units 108 which the respective processing units have as dedicated units. However, the respective units need not always perform the above operation through the first-resolution video sequence storage units 108 which the respective units have as dedicated units, and the respective processing units may be designed to share a single first-resolution video sequence storage unit.

According to the video rendering apparatus of this embodiment, since processing in a block included in the 3D data processing unit 2400 and processing in a block included in the 2D data processing unit 2410 are performed asynchronously and parallelly, the operation rate of each block can be increased as compared with the video rendering apparatus according to the first, second, and third embodiments.

As a consequence, a high-quality, high-resolution global illumination video can be interactively rendered.

Fifth Embodiment

General-Purpose Video Processing (General-Purpose Video Processing in Only 2D Data Processing Unit)

FIG. 25 shows the arrangement of a video rendering apparatus according to the fifth embodiment. As is obvious from FIG. 25, the video rendering apparatus of this embodiment is characterized by having only the 2D data processing unit 2410 of the video rendering apparatus according to the fourth embodiment in FIG. 24.

Assume that in the video rendering apparatus of this embodiment, the low-resolution video data of a plurality of frames which are calculated in advance are held in a first-resolution video sequence storage unit 108.

The video rendering apparatuses according to the first, second, third, and fourth embodiments are based on the assumption that low-resolution video data is calculated from CG data. In contrast, the video rendering apparatus according to the fifth embodiment is designed to input low-resolution video data calculated from a video source other than CG data by another technique.

According to this embodiment, a high-quality, high-resolution video can be interactively rendered from an arbitrary video source without being limited by CG data.

Sixth Embodiment

Multicore Arrangement of 3D Data Processing Units (on Frame Basis)

FIG. 26 shows the arrangement of a video rendering apparatus according to the sixth embodiment. As is obvious from FIG. 26, a video rendering apparatus 2600 of this embodiment is characterized by having a plurality of 3D data processing units 2400 each identical to the 3D data processing unit of the video rendering apparatus of the fourth embodiment in FIG. 24.

In the video rendering apparatus according to the fourth embodiment in FIG. 24, the balance between the processing amount of the 3D data processing unit 2400 and the processing amount of the 2D data processing unit 2410 dynamically changes depending on various factors, e.g., the amount of CG data acquired from the CG data storage unit 101, the number of intersections (the number of low-resolution sampling points) calculated by the intersection coordinate calculation unit 103, the amount of illumination calculation in the intersection color calculation unit 105, the bandwidth of the first-resolution video sequence storage unit 108, the resolution of a high-resolution video finally presented to the presentation unit 112, and the throughput of each block. For this reason, in a given frame, processing in the 3D data processing unit 2400 may become a bottleneck, resulting in a decrease in frame rate.

In the video rendering apparatus of this embodiment, a control unit 113 assigns processes for different frames to a plurality of 3D data processing units 2400, and makes the units perform the processes asynchronously and parallelly, thereby preventing the processes in the 3D data processing units 2400 from becoming a bottleneck.

According to this embodiment, for example, while a given one of the 3D data processing units 2400 processes the first frame, a different one of the 3D data processing units 2400 can concurrently process a different frame, e.g., the second or third frame.

Note that in assigning processes to a plurality of 3D data processing units 2400, the control unit 113 may select 3D data processing units 2400 on which relatively light loads are imposed at that time and assign the processes to them.

As described above, according to the video rendering apparatus of this embodiment, even when processing in the 3D data processing unit 2400 in the video rendering apparatus of the fourth embodiment becomes a bottleneck, a high-quality, high-resolution global illumination video can be rendered.

Seventh Embodiment

Multicore Arrangement of 3D Data Processing Units (on Block Basis)

FIG. 27 shows the arrangement of a video rendering apparatus 2700 according to the seventh embodiment. As is obvious from FIG. 27, the video rendering apparatus of this embodiment is characterized in that a low-resolution video block combining unit 2701 is added to the video rendering apparatus of the sixth embodiment in FIG. 26.

In the video rendering apparatus of this embodiment, a control unit 113 assigns processes for different video blocks of the same frame to a plurality of 3D data processing units 2400, and makes the units perform the processes asynchronously and parallelly. The low-resolution video block combining unit 2701 then combines the low-resolution video data of the different video blocks which are the processing results.

As shown in FIG. 28, a video block represents an area obtained by dividing the video of a given frame into arbitrary rectangles. For example, the same video block size and the same dividing technique may be used for all frames. Alternatively, the control unit 113 may control them for each frame so as to make the numbers of low-resolution sampling points as even as possible.

With this arrangement, while a given one of the 3D data processing units 2400 processes the first video block, a different one of the 3D data processing units 2400 can concurrently process a different video block such as the second or third video block. This can prevent the processes in the 3D data processing units 2400 from becoming a bottleneck.

Note that in assigning processes to a plurality of 3D data processing units 2400, the control unit 113 may select 3D data processing units 2400 on which relatively light loads are imposed at that time and assign the processes to them.

As described above, according to the video rendering apparatus of this embodiment, even when processing in the 3D data processing unit 2400 in the video rendering apparatus of the fourth embodiment becomes a bottleneck, a high-quality, high-resolution global illumination video can be rendered.

Eighth Embodiment

Multicore Arrangement of 2D Data Processing Units (on Frame Basis)

FIG. 29 shows the arrangement of a video rendering apparatus 2900 according to the eighth embodiment. As is obvious from FIG. 29, the video rendering apparatus of this embodiment is characterized by having a plurality of 2D data processing units 2410 each identical to the 2D data processing unit of the video rendering apparatus according to the fourth embodiment in FIG. 24.

As described above, in the video rendering apparatus according to the fourth embodiment in FIG. 24, the balance between the processing amount of the 3D data processing unit 2400 and the processing amount of the 2D data processing unit 2410 dynamically changes depending on various factors. For this reason, in a given frame, processing in the 2D data processing unit 2410 may become a bottleneck, resulting in a decrease in frame rate.

In the video rendering apparatus of this embodiment, a control unit 113 assigns processes for different frames to a plurality of 2D data processing units 2410, and makes the units perform the processes asynchronously and parallelly, thereby preventing the processes in the 2D data processing units 2410 from becoming a bottleneck.

With this arrangement, for example, while a given one of the 2D data processing units 2410 processes the first frame, a different one of the 2D data processing units 2410 can concurrently process a different frame, e.g., the second or third frame.

Note that in assigning processes to a plurality of 2D data processing units 2410, the control unit 113 may select 2D data processing units 2410 on which relatively light loads are imposed at that time and assign the processes to them.

As described above, according to the video rendering apparatus of this embodiment, even when processing in the 2D data processing unit 2410 in the video rendering apparatus of the fourth embodiment becomes a bottleneck, a high-quality, high-resolution global illumination video can be rendered.

Ninth Embodiment

Multicore Arrangement of 2D Data Processing Units (on Block Basis)

FIG. 30 shows the arrangement of a video rendering apparatus 3000 according to the ninth embodiment. As is obvious from FIG. 30, the video rendering apparatus of this embodiment is characterized in that a low-resolution video block dividing unit 3001 and a high-resolution video block combining unit 3002 are added to the video rendering apparatus of the eighth embodiment in FIG. 29.

In the video rendering apparatus according to this embodiment, the low-resolution video data of a given frame output from a single 3D data processing unit 2400 is divided by the low-resolution video block dividing unit 3001, and the resultant data are assigned to a plurality of 2D data processing units 2410 to be processed asynchronously and parallelly. The high-resolution video data of different video blocks as the processing results are then combined by the high-resolution video block combining unit 3002.

With this arrangement, while a given one of the 2D data processing units 2410 processes the first video block, a different one of the 2D data processing units 2410 can concurrently process a different video block such as the second or third video block. This can prevent the processes in the 2D data processing units 2410 from becoming a bottleneck.

Note that, for example, the same video block size and the same dividing technique may be used for all frames. Alternatively, a control unit 113 may control the low-resolution video block dividing unit 3001 for each frame so as to make the numbers of low-resolution sampling points as even as possible.

Note that in assigning processes to a plurality of 2D data processing units 2410, the control unit 113 may select 2D data processing units 2410 on which relatively light loads are imposed at that time and assign the processes to them.

As described above, according to the video rendering apparatus of this embodiment, even when processing in the 2D data processing unit 2410 in the video rendering apparatus of the fourth embodiment becomes a bottleneck, a high-quality, high-resolution global illumination video can be rendered.

10th Embodiment

Multicore Arrangement of 3D Data Processing Units and 2D Processing Units (on Frame Basis with Uniform Parallelism)

FIG. 31 shows the arrangement of a video rendering apparatus 3100 according to the 10th embodiment. As is obvious from FIG. 31, the video rendering apparatus of this embodiment is characterized by having a plurality of 3D data processing units 2400 each identical to the 3D data processing unit of the video rendering apparatus according to the fourth embodiment in FIG. 24 and a plurality of 2D data processing units 2410 each identical to the 2D data processing unit of the same apparatus. Assume that in the video rendering apparatus of this embodiment, the 3D data processing units 2400 are equal in number to the 2D data processing units 2410, and they are connected in a one-to-one relationship.

As described above, in the video rendering apparatus according to the fourth embodiment in FIG. 24, the balance between the processing amount of the 3D data processing unit 2400 and the processing amount of the 2D data processing unit 2410 dynamically changes depending on various factors. For this reason, in a given frame, processing in the 3D data processing unit 2400 may become a bottleneck, resulting in a decrease in frame rate. In contrast, at the same time, processing in the 2D data processing unit 2410 may become a bottleneck, resulting in a decrease in frame rate.

In the video rendering apparatus of this embodiment, a control unit 113 assigns processes for different frames to a plurality of 3D data processing units 2400 and a plurality of 2D data processing units 2410 which are connected in a one-to-one relationship with the 3D data processing units 2400, and make the units perform processes asynchronously and parallelly.

With this arrangement, while a given pair of 3D data processing unit 2400 and 2D data processing unit 2410 connected in a one-to-one relationship processes the first frame, a different pair of 3D data processing unit 2400 and 2D data processing unit 2410 can concurrently process a different frame, e.g., the second or third frame. This makes it possible to prevent processes in the 3D data processing units 2400 and processes in the 2D data processing units 2410 from becoming a bottleneck.

Note that in assigning processes to a plurality of 3D data processing units 2400 and a plurality of 2D data processing units 2410 connected in a one-to-one relationship therewith, the control unit 113 may select pairs on which relatively light loads are imposed at that time and assign the processes to them.

As described above, according to the video rendering apparatus of this embodiment, even when processing in the 3D data processing unit 2400 or 2D data processing unit 2410 in the video rendering apparatus of the fourth embodiment becomes a bottleneck, a high-quality, high-resolution global illumination video can be rendered.

11th Embodiment

Multicore Arrangement of 3D Data Processing Units and 2D Processing Units (on Block Basis with Uniform Parallelism)

FIG. 32 shows the arrangement of a video rendering apparatus 3200 according to the 11th embodiment. As is obvious from FIG. 32, the video rendering apparatus of this embodiment is characterized in that a high-resolution video block combining unit 3002 is added to the video rendering apparatus of the 10th embodiment in FIG. 31.

In the video rendering apparatus of this embodiment, a control unit 113 assigns processes for different video blocks to a plurality of 3D data processing units 2400 and a plurality of 2D data processing units 2410 which are connected in a one-to-one relationship with the 3D data processing units 2400, and make the units perform processes asynchronously and parallelly. The high-resolution video data of the different video blocks as the processing results are combined by the high-resolution video block combining unit 3002.

With this arrangement, while a given pair of 3D data processing unit 2400 and 2D data processing unit 2410 connected in a one-to-one relationship processes the first video block, a different pair of 3D data processing unit 2400 and 2D data processing unit 2410 can concurrently process a different video block, e.g., the second or third video block. This makes it possible to prevent processes in the 3D data processing units 2400 and processes in the 2D data processing units 2410 from becoming a bottleneck.

For example, the same video block size and the same dividing technique may be used for all frames. Alternatively, the control unit 113 may control them for each frame so as to make the numbers of low-resolution sampling points as even as possible.

Note that in assigning processes to a plurality of 3D data processing units 2400 and a plurality of 2D data processing units 2410 connected in a one-to-one relationship therewith, the control unit 113 may select pairs on which relatively light loads are imposed at that time and assign the processes to them.

As described above, according to the video rendering apparatus of this embodiment, even when processing in the 3D data processing unit 2400 or 2D data processing unit 2410 in the video rendering apparatus of the fourth embodiment becomes a bottleneck, a high-quality, high-resolution global illumination video can be rendered.

12th Embodiment

Multicore Arrangement of 3D Data Processing Units and 2D Processing Units (on Frame Basis with Nonuniform Parallelism)

FIG. 33 shows the arrangement of a video rendering apparatus 3300 according to the 12th embodiment. As is obvious from FIG. 33, the video rendering apparatus of this embodiment is characterized by having a plurality of 3D data processing units 2400 each identical to the 3D data processing unit of the video rendering apparatus according to the fourth embodiment in FIG. 24 and a plurality of 2D data processing units 2410 each identical to the 2D data processing unit of the same apparatus.

In the video rendering apparatus according to this embodiment, the number of 3D data processing units 2400 need not be equal to the number of 2D data processing units 2410, and they are connected to each other though a bus, unlike in the video rendering apparatus according to the fourth embodiment in FIG. 24.

In the video rendering apparatus according to this embodiment, a control unit 113 assigns processes for different frames to a plurality of 3D data processing units 2400, and also assigns the processing results to 2D data processing units 2410 on which relatively light loads are imposed at that time.

With this arrangement, while a given pair of 3D data processing unit 2400 and 2D data processing unit 2410 connected through the bus processes the first frame, a different pair of 3D data processing unit 2400 and 2D data processing unit 2410 can concurrently process a different frame, e.g., the second or third frame. This makes it possible to prevent processes in the 3D data processing units 2400 and processes in the 2D data processing units 2410 from becoming a bottleneck.

Preferentially assigning processes to 2D data processing units 2410 on which light loads are imposed makes it possible to increase the operation rate of each 2D data processing unit 2410. This can increase the frame rate.

Note that in assigning processes to a plurality of 3D data processing units 2400, the control unit 113 may select units on which relatively light loads are imposed at that time and assign processes to them.

As described above, according to the video rendering apparatus of this embodiment, even when processing in the 3D data processing unit 2400 or 2D data processing unit 2410 becomes a bottleneck in the video rendering apparatus of the fourth embodiment, a high-quality, high-resolution global illumination video can be interactively rendered.

13th Embodiment

Multicore Arrangement of 3D Data Processing Units and 2D Processing Units (on Block Basis with Nonuniform Parallelism)

FIG. 34 shows the arrangement of a video rendering apparatus 3400 according to the 13th embodiment. As is obvious from FIG. 34, the video rendering apparatus of this embodiment is characterized in that a low-resolution video block distributing unit 3401 is added to the video rendering apparatus of the 12th embodiment in FIG. 33. As in the video rendering apparatus according to the 12th embodiment in FIG. 33, the number of 3D data processing units 2400 need not be equal to the number of 2D data processing units 2410.

In the video rendering apparatus according to this embodiment, a control unit 113 assigns processes for different video blocks to the plurality of 3D data processing units 2400, and makes them process the blocks asynchronously and parallelly. The low-resolution video block distributing unit 3401 distributes the low-resolution video block data of the different video blocks as the processing results to 2D data processing units 2410 on which relatively light loads are imposed at that time. At this time, the low-resolution video block distributing unit 3401 may be designed to temporarily combine the low-resolution video data of the different video blocks received from the 3D data processing units 2400, re-divide the resultant data into video blocks in an arbitrary number or arbitrary size, and distribute the blocks to the 2D data processing units 2410. This makes it possible to concurrently process different video blocks.

Preferentially assigning processes to 2D data processing units 2410 on which light loads are imposed makes it possible to increase the operation rate of each 2D data processing unit 2410. This can increase the frame rate.

Note that in assigning processes to a plurality of 3D data processing units 2400, the control unit 113 may select units on which relatively light loads are imposed at that time and assign processes to them.

As described above, according to the video rendering apparatus of this embodiment, even when processing in the 3D data processing unit 2400 or 2D data processing unit 2410 becomes a bottleneck in the video rendering apparatus of the fourth embodiment, a high-quality, high-resolution global illumination video can be interactively rendered.

14th Embodiment

Data Amount-Dependent Dynamic Control on Number of Sampling Points

The arrangement of a video rendering apparatus according to the 14th embodiment is the same as that according to the fourth embodiment in FIG. 24. A characteristic feature of the video rendering apparatus according to this embodiment is that a control unit 113 included in a 3D data processing unit 2400 dynamically controls the number of intersections (the amount of low-resolution video data per frame) to be calculated by an intersection coordinate calculation unit 103 in accordance with the amount of data (measured by the control unit 113) flowing between a first-resolution video sequence storage unit 108 of the 3D data processing unit 2400 and a first-resolution video sequence storage unit 108 of a 2D data processing unit 2410. When, for example, the 3D data processing unit 2400 is connected to the 2D data processing unit 2410 through a network, the degree of congestion in the network sometimes changes as data transferred from other devices flow on the network.

In the video rendering apparatus according to this embodiment, therefore, when the amount of data flowing between the first-resolution video sequence storage unit 108 of the 3D data processing unit 2400 and the first-resolution video sequence storage unit 108 of the 2D data processing unit 2410 is relatively large, the control unit 113 included in the 3D data processing unit 2400 decreases the amount of low-resolution video data per frame by relatively decreasing the number of intersections to be calculated by the intersection coordinate calculation unit 103.

This can prevent transfer between the first-resolution video sequence storage unit 108 of the 3D data processing unit 2400 and the first-resolution video sequence storage unit 108 of the 2D data processing unit 2410 from becoming a bottleneck. Therefore, a high-resolution global illumination video can be rendered at a stable frame rate.

In contrast, if the amount of data flowing between the first-resolution video sequence storage unit 108 of the 3D data processing unit 2400 and the first-resolution video sequence storage unit 108 of the 2D data processing unit 2410 is relatively small, the control unit 113 included in the 3D data processing unit 2400 increases the amount of low-resolution video data per frame by relatively increasing the number of intersections to be calculated by the intersection coordinate calculation unit 103. This increases the number of intersections (sampling points) which can be used by the third-resolution video calculation unit 110. Therefore, a high-quality, high-resolution global illumination video can be interactively rendered.

As described above, according to the video rendering apparatus of this embodiment, even if the amount of data flowing between the 3D data processing unit 2400 and the 2D data processing unit 2410 changes due to an external factor, a high-resolution global illumination video with highest possible quality can be rendered while the frame rate is kept stable.

15th Embodiment

Bandwidth-Dependent Dynamic Control on Number of Sampling Points

A characteristic feature of a video rendering apparatus according to this embodiment is that a control unit 113 dynamically controls the number of intersections (the amount of low-resolution video data per frame) to be calculated by an intersection coordinate calculation unit 103 in accordance with the magnitude of the bandwidth of the first-resolution video sequence storage unit 108 of the video rendering apparatus according the first, second, or third embodiments in FIG. 1, or the video rendering apparatus according to the fourth embodiment in FIG. 24.

Assume that the first-resolution video sequence storage unit 108 is formed on part of a single large memory, and the remaining part of the memory is accessed by other devices. When accesses from other devices concentrate in a given frame, the bandwidth of the memory is consumed, and the bandwidth of the first-resolution video sequence storage unit 108 may decrease.

In the video rendering apparatus according to this embodiment, therefore, when the bandwidth of the first-resolution video sequence storage unit 108 is relatively small, the control unit 113 decreases the amount of low-resolution video data per frame by relatively decreasing the number of intersections to be calculated by the intersection coordinate calculation unit 103. This can prevent data transfer with the first-resolution video sequence storage unit 108 from becoming a bottleneck. Therefore, a high-resolution global illumination video can be rendered at a stable frame rate.

In contrast, when the bandwidth of the first-resolution video sequence storage unit 108 is relatively large, the control unit 113 increases the amount of low-resolution video data per frame by relatively increasing the number of intersections to be calculated by the intersection coordinate calculation unit 103. With this operation, the number of intersections (sampling points) which can be used in a third-resolution video calculation unit 110 increases, and hence a high-resolution global illumination video with higher quality can be rendered.

As described above, according to the video rendering apparatus of this embodiment, even if the bandwidth of the first-resolution video sequence storage unit 108 changes due to an external factor, a high-resolution global illumination video with highest possible quality can be rendered while the frame rate is kept stable.

16th Embodiment

Interactivity-Dependent Dynamic Control on Number of Sampling Points

FIG. 35 shows the arrangement of a video rendering apparatus according to the 16th embodiment. A characteristic feature of the video rendering apparatus according to the 16th embodiment is that a control unit 113 dynamically controls the number of intersections (the amount of low-resolution video data per frame) to be calculated by an intersection coordinate calculation unit 103 in accordance with the magnitude of the interactivity of a video rendered in the current frame.

When, for example, a video is rendered in the current frame, which must dynamically change in accordance with user input, the control unit 113 decreases the amount of low-resolution video data per frame by relatively decreasing the number of intersections to be calculated by the intersection coordinate calculation unit 103. With this operation, since the amount of data to be processed by the subsequent blocks decreases, a high-resolution global illumination video can be rendered at a stable frame rate.

In contrast, when a static video which does not change in accordance with user input (e.g., the video of a replay scene in a game) is rendered in the current frame, the control unit 113 increases the amount of low-resolution video data per frame by relatively increasing the number of intersections to be calculated by the intersection coordinate calculation unit 103. This increases the number of intersections (sampling points) which can be used in a third-resolution video calculation unit 110, and hence a high-resolution global illumination video can be rendered with higher quality.

Note that the magnitude of the interactivity of the current frame is held as numerical data in a CG data storage unit 101 in advance. An interactivity evaluation unit 3501 acquires this numerical data from the CG data storage unit 101, and outputs an evaluation value based on the acquired value. The acquired data may be directly used as an evaluation value, or may be combined with another CG data such as a motion vector to calculate an evaluation-value.

The control unit 113 receives the evaluation value output from the interactivity evaluation unit 3501, and dynamically controls the number of intersections to be calculated by the intersection coordinate calculation unit 103 based on the evaluation value.

As described above, according to the video rendering apparatus of this embodiment, the tradeoff between a frame rate and quality can be dynamically adjusted in accordance with the magnitude of interactivity required for a video which is rendered in the current frame.

17th Embodiment

Power Consumption-Dependent Dynamic Control on Number of Sampling Points

A characteristic feature of a video rendering apparatus according to the 17th embodiment is that the control unit 113 of the video rendering apparatus according to the first, second, or third embodiments shown in FIG. 1, or the video rendering apparatus according to the fourth embodiment in FIG. 24 dynamically changes the number of intersections (the amount of low-resolution video data per frame) to be calculated by an intersection coordinate calculation unit 103 in accordance with the current power consumption. The control unit 113 measures the current power consumption.

If, for example, the power consumption in the current frame is relatively high, the control unit 113 decreases the amount of low-resolution video data per frame by relatively decreasing the number of intersections to be calculated by the intersection coordinate calculation unit 103. This decreases the amount of data to be processed by the subsequent blocks, and hence a high-resolution global illumination video can be rendered while an increase in power consumption is suppressed.

In contrast, if the power consumption in the current frame is relatively low, the control unit 113 increases the amount of low-resolution video data per frame by relatively increasing the number of intersections to be calculated by the intersection coordinate calculation unit 103. With this operation, since the number of intersections (sampling points) which can be used in a third-resolution video calculation unit 110 increases, a high-resolution global illumination video with higher quality can be rendered.

As described above, according to the video rendering apparatus of this embodiment, a high-resolution global illumination video with highest possible quality can be rendered while an increase in power consumption is suppressed.

According to the video rendering apparatus and method and the program of each embodiment described above, the number of sampling points per frame can be decreased as compared with the prior art by filtering low-resolution sampling points in a plurality of frames. As a consequence, a high-quality, high-resolution global illumination video can be interactively rendered. By using motion vectors at sampling points and object IDs which are obtained when a CG image is rendered, high-speed, stable matching calculation can be realized.

What is claimed is:

1. A video rendering apparatus comprising:
   a first storage unit configured to store computer graphics (CG) data containing data about coordinate transformation, data about a camera, data about geometry, data about a light source, and data about texture;
   a transformation unit configured to transform a coordinate system of the CG data into a camera coordinate system which is a coordinate system viewed from a viewpoint;
   a first calculation unit configured to calculate a plurality of intersections of an object in 3-dimensional (3D) space and ray vectors passing through sampled points sampled from pixels on an image plane by referring to the transformed CG data;
   a second calculation unit configured to calculate a plurality of 3D motion vectors at the intersections by referring to the transformed CG data;
   a third calculation unit configured to calculate a plurality of color values at the intersections by referring to the transformed CG data;
   an assignment unit configured to assign a plurality of object identifications of the intersections which differ for each object to the intersections by referring to the transformed CG data;
   a projection unit configured to project the intersections and the 3D motion vectors onto a projection plane by referring to the transformed CG data, and to calculate 2-dimensional (2D) coordinates at the intersections and 2D motion vectors at the intersections;

a resolution storage unit configured to store the 2D coordinates, the 2D motion vectors, the color values, and the assigned object IDs together as low-resolution video data in frame;

an intermediate-resolution calculation unit configured to calculate intermediate-resolution video data by superimposing low-resolution video data of a current frame onto low-resolution video data of a plurality of frames temporally different from the current frame;

a high-resolution calculation unit configured to calculate high-resolution video data by filtering the intermediate-resolution video data;

a second storage unit configured to store the high-resolution video data in frame; and a presentation unit configured to present the high-resolution video data.

2. The apparatus according to claim 1, wherein the intermediate-resolution calculation unit calculates the intermediate-resolution video data by superimposing the low-resolution video data of the current frame onto the low-resolution video data of the plurality of frames temporally succeeding the current frame.

3. The apparatus according to claim 1, wherein the intermediate-resolution calculation unit calculates the intermediate-resolution video data by superimposing the low-resolution video data of the current frame onto the low-resolution video data of the plurality of frames temporally preceding the current frame.

4. The apparatus according to claim 1, wherein the intermediate-resolution calculation unit calculates the intermediate-resolution video data by superimposing the low-resolution video data of the current frame, the low-resolution video data of the plurality of frames temporally succeeding the current frame, and the low-resolution video data of the plurality of frames temporally preceding the current frame.

5. The apparatus according to claim 1, wherein the intermediate-resolution calculation unit comprises:

an acquisition unit configured to acquire the 2D coordinates of the intersections and the 2D motion vectors at the intersections which are contained in the low-resolution video data of the current frame;

an acquisition unit configured to acquire a plurality of 2D coordinates of intersections and a plurality of 2D motion vectors at intersections which are contained in low-resolution video data of a frame temporally different from the current frame;

a selection unit configured to select a 2D motion vector representing a backward motion to the current frame from the acquired 2D motion vectors; and an addition unit configured to add low-resolution video data corresponding to the selected 2D motion vector and the low-resolution video data of the current frame.

6. The apparatus according to claim 1, wherein the high-resolution calculation unit comprises:

a selection unit configured to select a plurality of pixels in accordance with the high-resolution video data to be presented;

a selection unit configured to select, for each of the pixels, a plurality of first intersections included in an area which is centered on the each of the pixels and has a size from intersections contained in the intermediate-resolution video data;

a selection unit configured to select a second intersection, of the first intersections, which are contained in a frame different from the current frame;

a selection unit configured to select, for the selected second intersection, a third intersection contained in the current frame from an area which is centered on the second intersection and has a size determined in accordance with the object;

a comparison unit configured to compare an object identification of the second intersection with an object ID of the third intersection;

a removing unit configured to remove the second intersection from the intermediate-resolution video data if the comparison unit determines that the object identification of the second intersection differs from the object identification of the third intersection; and a calculation unit configured to calculate a plurality of color values of the pixels based on intersections, of the intersections contained in the intermediate-resolution video data, which fail to be removed.

7. A video rendering apparatus comprising a 3-dimensional (3D) data processing unit and 2-dimensional (2D) data processing unit, the 3D data processing unit including:

a first storage unit configured to store computer graphics (CG) data containing data about coordinate transformation, data about a camera, data about geometry, data about a light source, and data about texture;

a transformation unit configured to transform a coordinate system of the CG data into a camera coordinate system which is a coordinate system viewed from a viewpoint;

a first calculation unit configured to calculate a plurality of intersections of an object in 3D space and ray vectors passing through sampled points sampled from pixels on an image plane by referring to the transformed CG data;

a second calculation unit configured to calculate a plurality of 3D motion vectors at 3D coordinates by referring to the transformed CG data;

a third calculation unit configured to calculate a plurality of color values at the intersections by referring to the transformed CG data;

an assignment unit configured to assign a plurality of object identifications of the intersections which differ for each object, at the 3D coordinates, to the intersections by referring to the transformed CG data;

a projection unit configured to project the intersections and the 3D motion vectors onto a projection plane by referring to the transformed CG data, and to calculate 2D coordinates at the intersections and 2D motion vectors at the intersections; and a resolution storage unit configured to store the 2D coordinates, the 2D motion vectors, the color values, and the assigned object IDs together as low-resolution video data in frame, and the 2D data processing unit including:

a resolution storage unit configured to store the 2D coordinates, the 2D motion vectors, the color values, and the assigned object IDs together as low-resolution video data in frame;

an intermediate-resolution calculation unit configured to calculate intermediate-resolution video data by superimposing low-resolution video data of a current frame onto low-resolution video data of a plurality of frames temporally different from the current frame;

a high-resolution calculation unit configured to calculate high-resolution video data by filtering the intermediate-resolution video data;

a second storage unit configured to store the high-resolution video data in frame; and a presentation unit configured to present the high-resolution video data.

8. The apparatus according to claim 7, further comprising:
a measurement unit configured to measure an amount of data flowing between the 3D data processing unit and the 2D data processing unit; and
a control unit configured to control a number of the intersections to be calculated by an intersection calculation unit in accordance with the measured amount of data.

9. The apparatus according to claim 7, further comprising:
a measurement unit configured to measure a bandwidth of the resolution storage unit; and
a control unit configured to control a number of the intersections to be calculated by the first calculation unit in accordance with the measured bandwidth.

10. The apparatus according to claim 7, further comprising:
an evaluation unit configured to evaluate a magnitude of interactivity for a video rendered in the current frame; and
a control unit configured to control a number of the intersections to be calculated by the first calculation unit in accordance with the evaluated magnitude of interactivity.

11. The apparatus according to claim 7, further comprising:
a measurement unit configured to measure power consumption in the current frame; and
a control unit configured to control a number of the intersections to be calculated by the first calculation unit in accordance with the power consumption.

12. A video rendering apparatus comprising:
a resolution storage unit configured to store a plurality of 2-dimensional (2D) coordinates of intersections of an object in 3-dimensional (3D) space and ray vectors passing through sampling points sampled from pixels of an image plane and a plurality of 2D motion vectors at the intersections, which are obtained by projecting 3D coordinates of the intersections and 3D motion vectors at the intersections of the 3D coordinates onto a projection plane by using CG data transformed into a camera coordinate system as a coordinate system viewed from a viewpoint, a plurality of color values of the intersections at the intersections of the 3D coordinates, and a plurality of object IDs of the intersections which differ for each object, together as low-resolution video data in frame;
an intermediate-resolution calculation unit configured to calculate intermediate-resolution video data by superimposing low-resolution video data of a current frame onto low-resolution video data of a plurality of frames temporally different from the current frame;
a high-resolution calculation unit configured to calculate high-resolution video data by filtering the intermediate-resolution video data;
a storage unit configured to store the high-resolution video data in frame; and
a presentation unit configured to present the high-resolution video data.

13. A video rendering apparatus comprising:
a plurality of 3D data processing units each defined in claim 7, said each 3D data processing unit processing a frame different from frames processed by other 3D data processing units; and
a 2D data processing unit defined in claim 7, the 2D data processing unit receiving low-resolution video data from said each 3D data processing unit.

14. A video rendering apparatus comprising:
a plurality of 3D data processing units, each defined in claim 7, said each 3D data processing unit processing a video block, of a plurality of video blocks as a plurality of areas obtained by dividing a video of a same frame in a shape, which is different from video blocks processed by other 3D data processing units;
a combining unit configured to combine low-resolution video data for each frame upon acquiring the low-resolution video data of each video block from said each 3D data processing unit, and to acquire low-resolution video data together in frame; and
a 2D data processing unit defined in claim 7, the 2D data processing unit receiving low-resolution video data from the combining unit.

15. A video rendering apparatus comprising:
a 3D data processing unit defined in claim 7; and
a plurality of 2D data processing units each defined in claim 7, said each 2D data processing unit processing a frame different from frames processed by other 2D data processing units.

16. A video rendering apparatus comprising:
a 3D data processing unit defined in claim 7;
a dividing unit configured to divide the low-resolution video data into a plurality of video blocks which are a plurality of areas obtained by dividing a video of a same frame in a shape;
a plurality of 2D data processing units each defined in claim 7, said each 2D data processing unit processing a video block different from video blocks processed by other 2D data processing units; and
a combining unit configured to combine each of the video blocks of the high-resolution video data calculated by said each 2D data processing unit.

17. A video rendering apparatus comprising:
a plurality of 3D data processing units each defined in claim 7, said each 3D data processing unit processing a frame different from frames processed by other 3D data processing units; and
a plurality of 2D data processing units defined in claim 7, said each 2D data processing unit being connected in a one-to-one relationship with said each 3D data processing unit and receiving low-resolution video data of each frame from said each 3D data processing unit.

18. A video rendering apparatus comprising:
a plurality of 3D data processing units each defined in claim 7, said each 3D data processing unit processing a video block, of a plurality of video blocks as a plurality of areas obtained by dividing a video of a same frame in a shape, which is different from video blocks processed by other 3D data processing units;
a plurality of 2D data processing units defined in claim 7, said each 2D data processing unit being connected in a one-to-one relationship with said each 3D data processing unit and receiving low-resolution video data of each video block from said each 3D data processing unit; and
a combining unit configured to combine each of the video blocks of the high-resolution video data calculated by said each 2D data processing unit.

19. A video rendering apparatus comprising:
a plurality of 3D data processing units each defined in claim 7, said each 3D data processing unit processing a frame different from frames processed by other 3D data processing units; and
a plurality of 2D data processing units defined in claim 7, said each 2D data processing unit selecting a 3D data processing unit from the 3D data processing units, and receiving low-resolution video data of each frame from the selected 3D data processing unit.

20. A video rendering apparatus comprising:
a plurality of 3D data processing units each defined in claim 7, said each 3D data processing unit processing a video block, of a plurality of video blocks as a plurality of areas obtained by dividing a video of a same frame in a shape, which is different from video blocks processed by other 3D data processing units;
a receiving unit configured to receive low-resolution video data of each video block from said each 3D data processing unit and to reconstruct low-resolution video data obtained by dividing each frame into video blocks having a size;
a plurality of 2D data processing units each defined in claim 7, said each 2D data processing unit receiving low-resolution video data of one of the video blocks having a size corresponding to a load on said each 2D data processing unit; and
a combining unit configured to combine each of the video blocks of the high-resolution video data calculated by said each 2D data processing unit.

21. A video rendering method comprising:
preparing a first storage unit configured to store computer graphics (CG) data containing data about coordinate transformation, data about a camera, data about geometry, data about a light source, and data about texture;
transforming a coordinate system of the CC data into a camera coordinate system which is a coordinate system viewed from a viewpoint;
calculating a plurality of intersections of an object in 3-dimensional (3D) space and ray vectors passing through sampled points sampled from pixels on an image plane by referring to the transformed CG data;
calculating a plurality of 3D motion vectors at the intersections by referring to the transformed CG data;
calculating a plurality of color values at the intersections by referring to the transformed CG data;
assigning a plurality of object identifications of the intersections which differ for each object to the intersections by referring to the transformed CG data;
projecting the intersections and the 3D motion vectors onto a projection plane by referring to the transformed CG data, and calculating 2-dimensional (2D) coordinates at the intersections and 2D motion vectors at the intersections;
preparing a resolution storage unit configured to store the 2D coordinates, the 2D motion vectors, the color values, and the assigned object IDs together as low-resolution video data in frame;
calculating intermediate-resolution video data by superimposing low-resolution video data of a current frame onto low-resolution video data of a plurality of frames temporally different from the current frame;
calculating high-resolution video data by filtering the intermediate-resolution video data;
preparing a second storage unit configured to store the high-resolution video data in frame; and
presenting the high-resolution video data.

22. A computer-readable medium including computer executable instructions, wherein the instructions, when executed by a processor, cause the processor to perform a method comprising:
storing, in a first storage unit, computer graphics (CG) data containing data about coordinate transformation, data about a camera, data about geometry, data about a light source, and data about texture;
transforming a coordinate system of the CG data into a camera coordinate system which is a coordinate system viewed from a viewpoint;
calculating a plurality of intersections of an object in 3-dimensional (3D) space and ray vectors passing through sampled points sampled from pixels on an image plane by referring to the transformed CG data;
calculating a plurality of 3D motion vectors at the intersections by referring to the transformed CG data;
calculating a plurality of color values at the intersections by referring to the transformed CG data;
assigning a plurality of object identifications (IDs) of the intersections which differ for each object to the intersections by referring to the transformed CG data;
projecting the intersections and the 3D motion vectors onto a projection plane by referring to the transformed CG data, and calculating 2-dimensional (2D) coordinates at the intersections and 2D motion vectors at the intersections;
storing, in a second storage unit, the 2D coordinates, the 2D motion vectors, the color values of the intersections, and the assigned object IDs together as low-resolution video data in frame;
calculating intermediate-resolution video data by superimposing low-resolution video data of a current frame onto low-resolution video data of a plurality of frames temporally different from the current frame;
calculating high-resolution video data by filtering the intermediate-resolution video data;
storing, in a third storage unit, the high-resolution video data in frame; and
presenting the high-resolution video data.

\* \* \* \* \*